US012582018B2

(12) United States Patent
Torzewski et al.

(10) Patent No.: US 12,582,018 B2
(45) Date of Patent: Mar. 24, 2026

(54) USE OF COVERAGE AREAS IN CONTROLLING AGRICULTURAL MACHINE OPERATIONS

(71) Applicant: DEERE & COMPANY, Moline, IL (US)

(72) Inventors: Michael A. Torzewski, Urbandale, IA (US); Pradeep Ghorpade, Pune (IN); Amey Katti, Pune (IN); Kshitija Harish Petkar, Pune (IN); Brandon M. McDonald, Urbandale, IA (US)

(73) Assignee: Deere & Company, Moline, IL (US)

( * ) Notice: Subject to any disclaimer, the term of this patent is extended or adjusted under 35 U.S.C. 154(b) by 261 days.

(21) Appl. No.: 18/492,476

(22) Filed: Oct. 23, 2023

(65) Prior Publication Data

US 2024/0049616 A1 Feb. 15, 2024

Related U.S. Application Data

(63) Continuation-in-part of application No. 17/879,179, filed on Aug. 2, 2022.

(51) Int. Cl.
*A01B 69/00* (2006.01)
*G05D 1/00* (2006.01)

(52) U.S. Cl.
CPC ......... *A01B 69/004* (2013.01); *G05D 1/0278* (2013.01)

(58) Field of Classification Search
None
See application file for complete search history.

(56) References Cited

U.S. PATENT DOCUMENTS 7,689,354 B2 3/2010 Heiniger et al.
7,747,370 B2 6/2010 Dix
(Continued)

FOREIGN PATENT DOCUMENTS

DE 102016118667 A1 4/2018
EP 1529428 B1 11/2012
(Continued)

OTHER PUBLICATIONS

Extended European Search Report and Written Opinion issued in European Patent Application No. 24200838.1 dated Mar. 3, 2025, in 05 pages.
(Continued)

*Primary Examiner* — Hongye Liang
(74) *Attorney, Agent, or Firm* — Taft Stettinius & Hollister LLP; Stephen F. Rost

(57) ABSTRACT

A guidance system that automatically switches guidance modes in connection with executing an end turn. As the agricultural machine travels in a first, row sense guidance mode along a first guidance line in a non-coverage area, an approaching boundary between the non-coverage area and a headland area is identified. If the headland area contains crop rows, then, upon reaching the boundary, the guidance system switches to a second, GPS guidance mode. The agricultural machine travels along a first turn guidance line from the first guidance line to a preexisting headland guidance line, wherein the guidance system switches to the first guidance mode. The agricultural machine then travels in a direction parallel to the crop rows of the headland area. When leaving the headland guidance line, the guidance system switches to the second guidance mode, and then back to the first guidance mode upon the agricultural machine returning to the boundary.

20 Claims, 11 Drawing Sheets

(56)     References Cited

U.S. PATENT DOCUMENTS

| 10,143,126 | B2 | 12/2018 | Foster et al. |
| 10,251,329 | B2 | 4/2019 | Foster et al. |
| 2006/0116798 | A1 | 6/2006 | Gibson et al. |
| 2006/0271243 | A1 | 11/2006 | Behnke |
| 2006/0282205 | A1 | 12/2006 | Lange |
| 2008/0030320 | A1 | 2/2008 | Wilcox |
| 2016/0366815 | A1 | 12/2016 | Guyette |
| 2017/0112049 | A1 | 4/2017 | Weisberg |
| 2017/0188505 | A1 | 7/2017 | Potier et al. |
| 2018/0321683 | A1 | 11/2018 | Foster et al. |
| 2020/0296878 | A1* | 9/2020 | Dix ..................... A01B 69/008 |
| 2021/0365036 | A1 | 11/2021 | Dix |
| 2022/0350344 | A1* | 11/2022 | Horstmann .......... G05D 1/0212 |

FOREIGN PATENT DOCUMENTS

| EP | 3146825 | A1 | 3/2017 |
| EP | 3165061 | B1 | 2/2019 |
| EP | 3146825 | B1 | 8/2021 |
| EP | 3300561 | B1 | 11/2021 |
| EP | 3903551 | A1 | 11/2021 |
| EP | 4095644 | A1 | 11/2022 |
| WO | 2020193157 | A1 | 10/2020 |

OTHER PUBLICATIONS

Extended European Search Report and Written Opinion issued in European Patent Application No. 23184485.3, dated Dec. 19, 2023, in 08 pages.

* cited by examiner

USE OF COVERAGE AREAS IN CONTROLLING AGRICULTURAL MACHINE OPERATIONS

FIELD OF THE DISCLOSURE

The present disclosure generally relates to agricultural machines, and, more specifically, to systems and methods for using the locations of coverage areas to control operations of agricultural machines.

BACKGROUND

Typically, crops are planted in rows along a field, with the rows often being generally spaced apart from, and parallel to, adjacent rows by a select distance. In such situations, as an agricultural machine, such as, for example, a combine harvester or sprayer, moves along the field, sensors mounted to the front of the vehicle can detect the presence and/or location of the adjacent crop(s), and thus the location of the associated row of crops. Such contact between the sensors and crop can be utilized in connection with guiding the agricultural machine so as to, for example, facilitate a particular alignment of the crops and/or crop row with the agricultural machine, including an alignment between the crops and one or more particular components of the agricultural machine.

For example, with respect to combine harvesters, including, self-propelled forge harvesters, among other harvesters, portions or sections of the combine harvester can be configured for cutting and processing crops. Such a combine harvester can include a header that is to be moved in a forward direction over a field. The header can comprise a laterally extending frame supporting a separating mechanism to separate a crop, such as, for example, corn, from a stalk. The separating mechanism is configured to either cut the crop or to break the crop from the stalk to collect the crop. Accordingly, information obtained from sensors mounted to the header that detect contact with adjacent crop can be utilized to guide movement of the combine harvester so as to at least generally align the crops with the separating mechanism of the harvester.

However, such sensors typically merely detect the presence of a contact with the sensor. Yet at times an agricultural machine can at least temporarily travel along areas of a field in which crops have already been harvested, and/or crops are not otherwise present, also referred to as a coverage area. Thus, while in a coverage area, such sensors can detect occurrences of contact between the sensor and materials other than crops, such as, for example, contact with remnants of crop material that remain in the field after harvesting, among other materials or items that can be located in the coverage area. Yet, such crop remnants or other materials can generally be scattered and/or randomly positioned on the field. Thus, utilizing detection of contact by the sensors with such remnants or other materials in a coverage area in connection with the guidance of the agricultural machine can result in unnecessary deviations in a path of travel of the agricultural machine.

Additionally, when traveling through a coverage area, the agricultural machine typically may not be performing an agricultural operation. Moreover, as crops may not be located in a coverage area, the agricultural machine may not be performing agricultural operations related to harvesting, spraying, or baling crops, among other agricultural operations. Accordingly, during such times, operation of such subsystems can result in unnecessary expenditures of energy or resources, as well as potential wear on components of subsystems of the agricultural machine.

What is needed therefore is a precise manner for controlling operations of an agricultural machine when passing into/from coverage areas without necessitating repeated operator interaction with control settings.

SUMMARY

The present disclosure may comprise one or more of the following features and combinations thereof.

In one embodiment of the present disclosure, a system is provided for guiding travel of an agricultural machine. The system can include a guidance system having a first guidance mode and a second guidance mode, the first guidance mode comprising a row sense guidance mode, at least one processor, and a memory device coupled with the at least one processor. The memory device can include instructions that when executed by the at least one processor can cause the at least one processor to determine an end turn guidance line for an end turn of the agricultural machine in a headland area, the end turn guidance line comprising a first turn guidance line, a second turn guidance line, and a headland guidance line. The first turn guidance line can be configured to guide the agricultural machine from a first guidance line that crosses a boundary between a non-coverage area and a headland area to the headland guidance line. The headland guidance line can extend in a direction that is generally parallel to a crop row in the headland area, and the second turn guidance line can be configured to guide the agricultural machine from the headland guidance line to a second guidance line that crosses the boundary. Further, the first guidance line and the second guidance line can be non-parallel to the direction of the crop row. The memory device can also include instructions that when executed by the at least one processor can cause the at least one processor to trigger an operation of the guidance system from the first guidance mode to the second guidance mode upon the agricultural machine reaching or crossing the boundary from the non-coverage area; trigger the operation of the guidance system from the second guidance mode to the first guidance mode upon the agricultural machine either (1) being aligned with, or on, the headland guidance line or (2) upon reaching an end location of the first turn guidance line; trigger the operation of the guidance system from the first guidance mode to the second guidance mode upon the agricultural machine reaching a start location of the second turn guidance line; and trigger the operation of the guidance system from the second guidance mode to the first guidance mode upon the agricultural machine reaching or crossing the boundary from the headland area.

In another embodiment of the present disclosure, a method is provided for guiding travel of an agricultural machine. The method can include determining an end turn guidance line for an end turn of the agricultural machine in a headland area, the end turn guidance line comprising a first turn guidance line, a second turn guidance line, and a headland guidance line. Further, the first turn guidance line can be configured to guide the agricultural machine from a first guidance line that crosses a boundary between a non-coverage area and a headland area to the headland guidance line. The headland guidance line can extend in a direction that is generally parallel to a crop row in the headland area, and the second turn guidance line can be configured to guide the agricultural machine from the headland guidance line to a second guidance line that crosses the boundary. The first guidance line and the second guidance line can be non-parallel to the direction of the crop row. Additionally, the method can include triggering an operation of the guidance system from the first guidance mode to the second guidance mode upon the agricultural machine reaching or crossing the boundary from the non-coverage area; triggering the operation of the guidance system from the second guidance mode to the first guidance mode upon the agricultural machine either (1) being aligned with, or on, the headland guidance line or (2) upon reaching an end location of the first turn guidance line; triggering the operation of the guidance system from the first guidance mode to the second guidance mode upon the agricultural machine reaching a start location of the second turn guidance line; and triggering the operation of the guidance system from the second guidance mode to the first guidance mode upon the agricultural machine reaching or crossing the boundary from the headland area.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Figure 3:
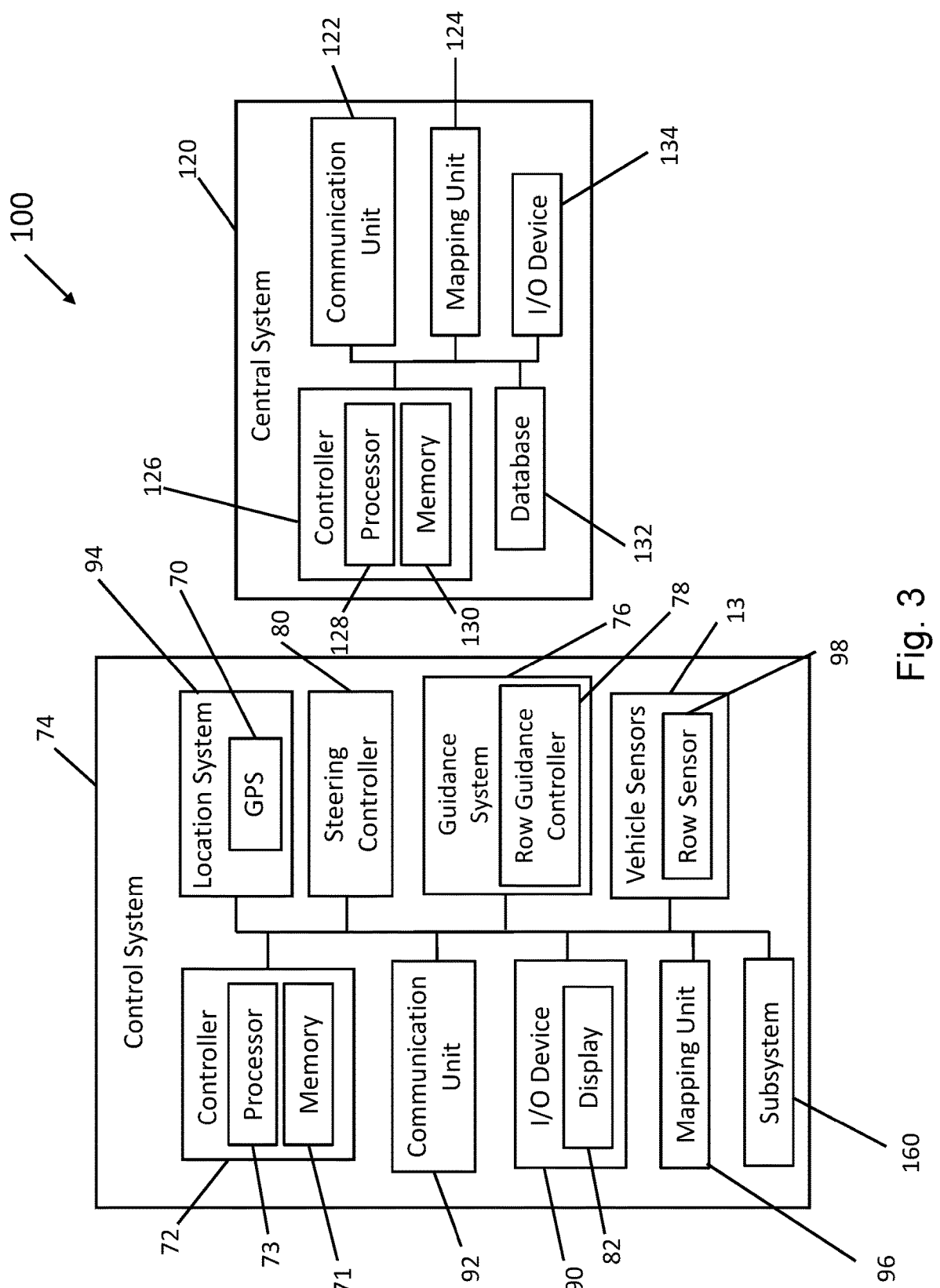
FIG. 3 is a diagrammatic view of a portion of an exemplary system for operating subsystems and guiding the agricultural machine shown in FIG. 1.
Figure 9:
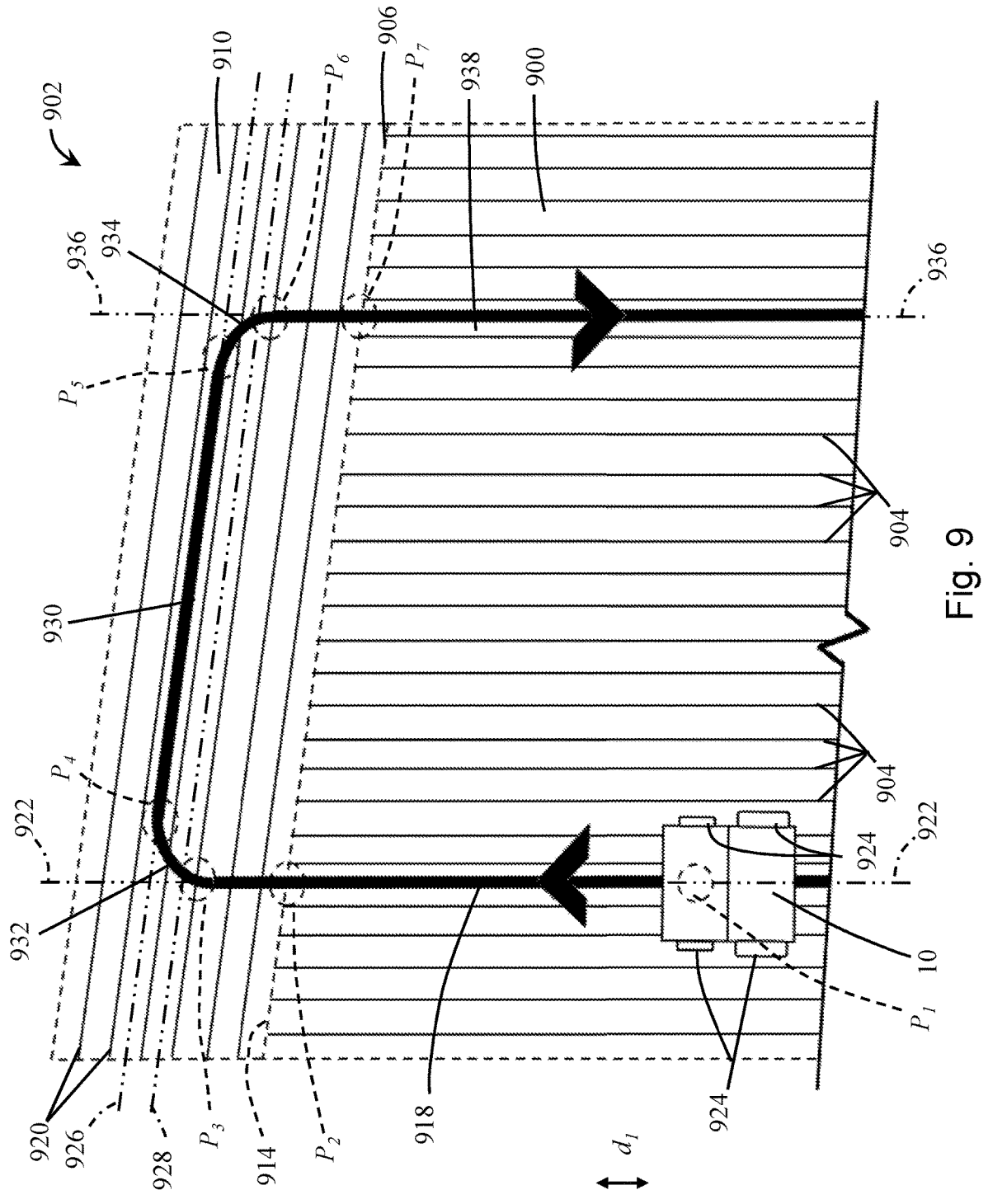
FIG. 9 is a first portion of an exemplary coverage map illustrating a first boundary between a first end of a non-coverage area and a first headland area, and in which the first
Figure 10:
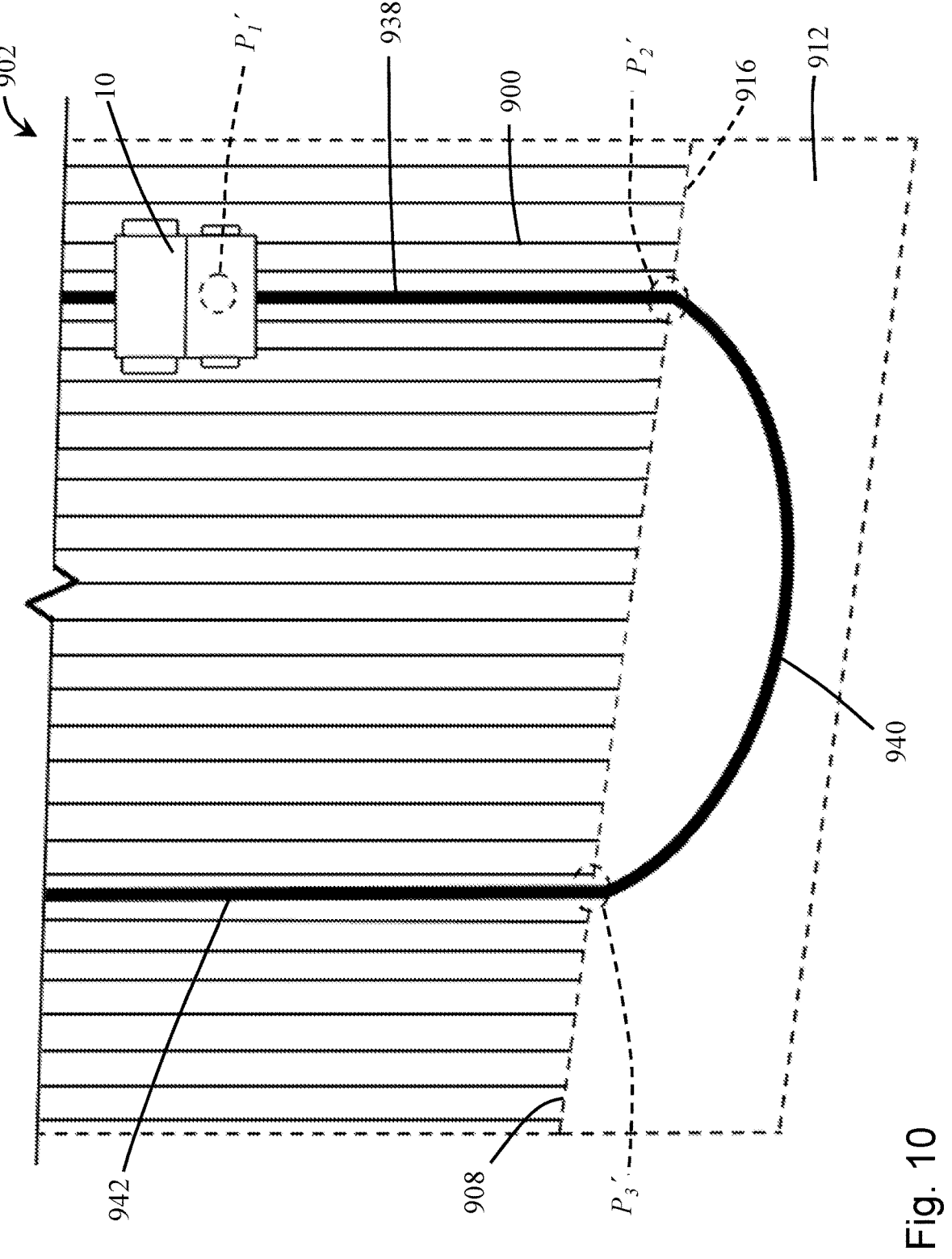
Figure 11:
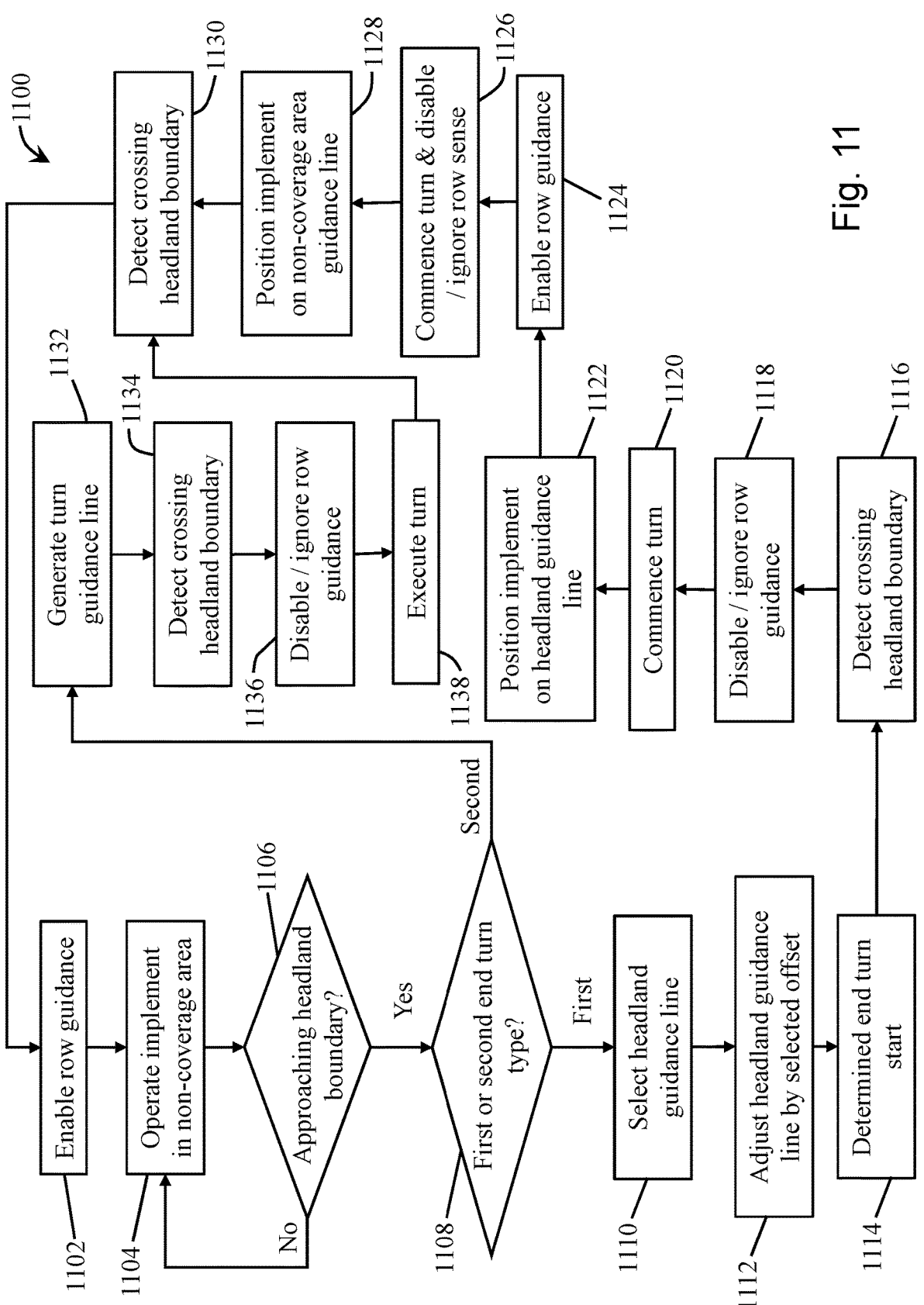

4 headland area has crop rows oriented in a direction that is different than the direction of orientation of the crop rows in the non-coverage area;

FIG. 10 is second portion of the exemplary coverage map shown in FIG. 9 illustrating a second boundary between a second end of the non-coverage area and a second headland area, and in which the second headland area is a coverage area; and FIG. 11 is a simplified flowchart of a method that can be performed by the system depicted in FIG. 3 for selective enabling and disabling of operation of a row sense guidance mode of a guidance system of an agricultural machine as the agricultural machine enters into, or exits from, a non-coverage area and a coverage or headland area.

Corresponding reference numerals are used to indicate corresponding parts throughout the several views.

DETAILED DESCRIPTION

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

Figure 1:
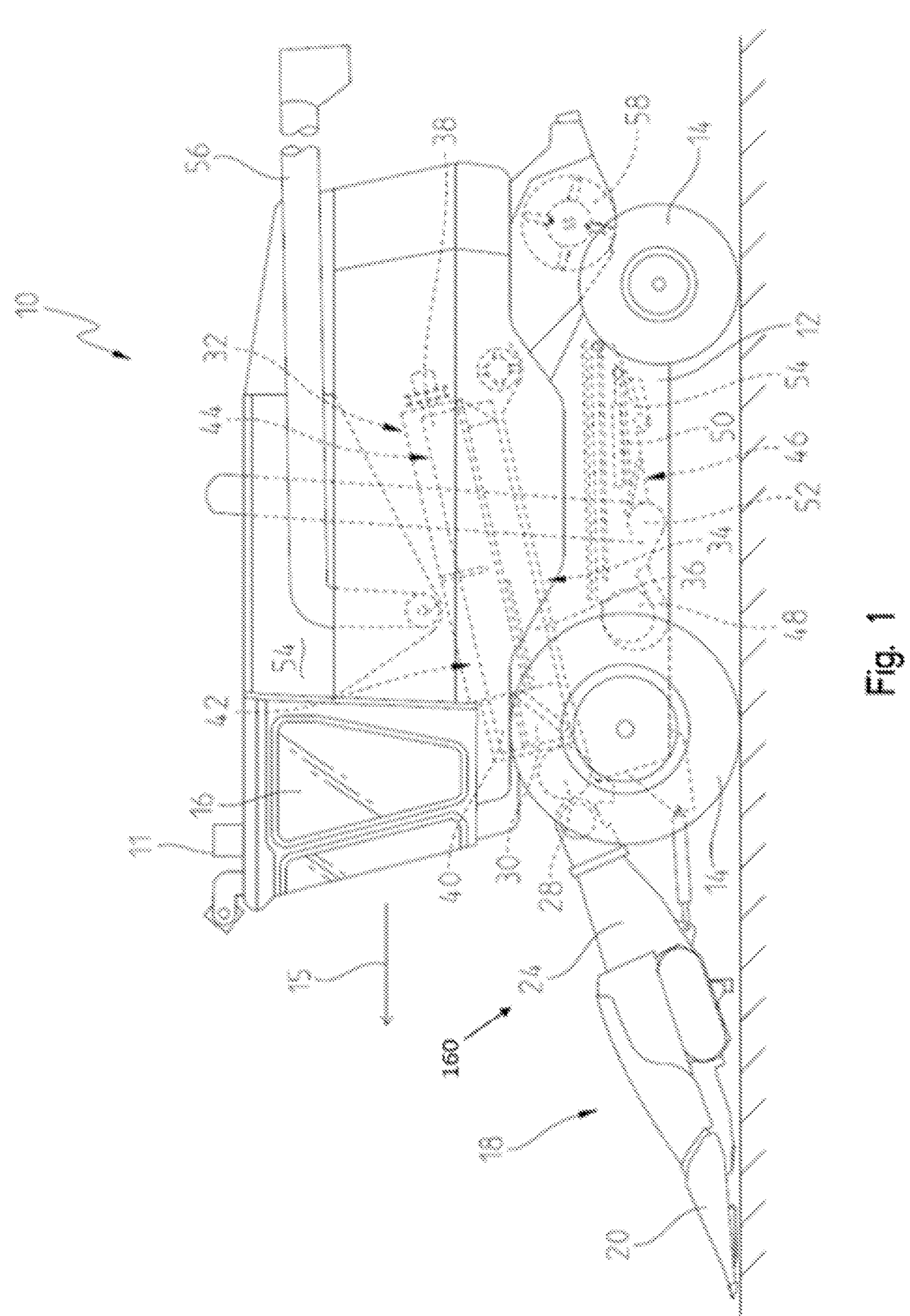
FIG. 1 is a side view of an exemplary agricultural machine having at least one subsystem for performing an agricultural operation.

FIG. 1 illustrates an embodiment of an agricultural machine 10. While the agricultural machine 10 illustrated in FIG. 1 and discussed below is a combine harvester, the subject disclosure is applicable to a variety of other types of agricultural machines, including, but not limited to, self-propelled forge harvesters and sprayers, among others. Further, while some of the below disclosure provides examples of the agricultural machine 10 being utilized in connection with harvesting a particular type of crop, such as corn, the subject disclosure is applicable to a variety of types of agricultural operations involving different types of crops.

As shown in FIG. 1, the illustrated agricultural machine 10 can include a chassis 12 and ground engaging mechanisms (e.g., wheels 14) that contact the ground. The wheels 14 are coupled to the chassis 12, and are used in connection with propulsion of the combine harvester 10 in a forward operating or travelling direction 15. The operation of the combine harvester 10 can be controlled from at least an operator's cab 16. The operator's cab 16, in some embodiments, includes one or more controls for controlling the operation of the combine harvester 10, including, but not limited to, controls relating to operating the agricultural machine 10 using an automated vehicle guidance system, such, as, for example, AutoTrac™ and/or AutoTrac™ Rowsense™ from John Deere, among other automated vehicle guidance systems. Additionally, the agricultural machine 10 can also include a location device, such as, for example, a receiver 11 of a global positioning system (GPS) 70 (FIG. 3) that can receive signals used in determining location information and/or coordinates.

The illustrated combine harvester 10 further includes a header 18, which in the illustrated example is a corn header. The exemplary header 18 is disposed at a forward end of the combine harvester 10 and includes a plurality of crop row dividers 20. In the illustrated embodiment, the crop row dividers 20 are configured to direct stalks of the crop, such as corn, into the header 18, and to separate corn ears from the stalks. The corn ears are directed by a crop auger assembly 22 (see FIG. 2) and a slope conveyor 24 toward a guide drum 28 that directs the corn ears to an inlet transition section 30. The inlet transition section 30 directs the cut crop to an axial harvested crop processing arrangement 32.

The harvested crop processing arrangement 32 can include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 32. A threshing section 42 and a separating section 44 are located downstream in the longitudinal direction and to the rear of the charging section 40. The drum 38 can be in the form of a truncated cone located in the charging section 40. The threshing section 42 can include a forward section in the form of a truncated cone and a cylindrical rear section. The cylindrical separating section 44 of the drum 38 is located at the rear or end of the axial harvested crop processing unit 32. In place of the axial harvested crop processing unit 32, a tangential threshing drum with a following axial threshing section or a straw chopper can also be used.

Corn and chaff that fall through a thresher basket associated with the threshing section 42 and through a separating grate associated with the separating section 44 may be directed to a cleaning system 46 with a blower 48 and sieves 50 with louvers. The sieves 50 can be oscillated in a fore-and-aft direction. The cleaning system 46 removes the chaff and guides the clean corn over a screw conveyor 52 to an elevator for clean corn (not shown). The elevator for clean corn deposits the clean corn in a corn tank 54. The clean corn in the corn tank 30 can be unloaded by means of an unloading screw conveyor 56 to a corn wagon, trailer, or truck (not shown). Harvested crop remaining at the lower end of the sieve 50 is again transported to the harvested crop processing arrangement 32 by a screw conveyor 54 and an overhead conveyor (not shown). The harvested crop residue delivered at the upper end of the sieve 50 that consists essentially of chaff and small straw particles may be conveyed by means of an oscillating sheet conveyor to a chopper rotor assembly 58.

Figure 2:
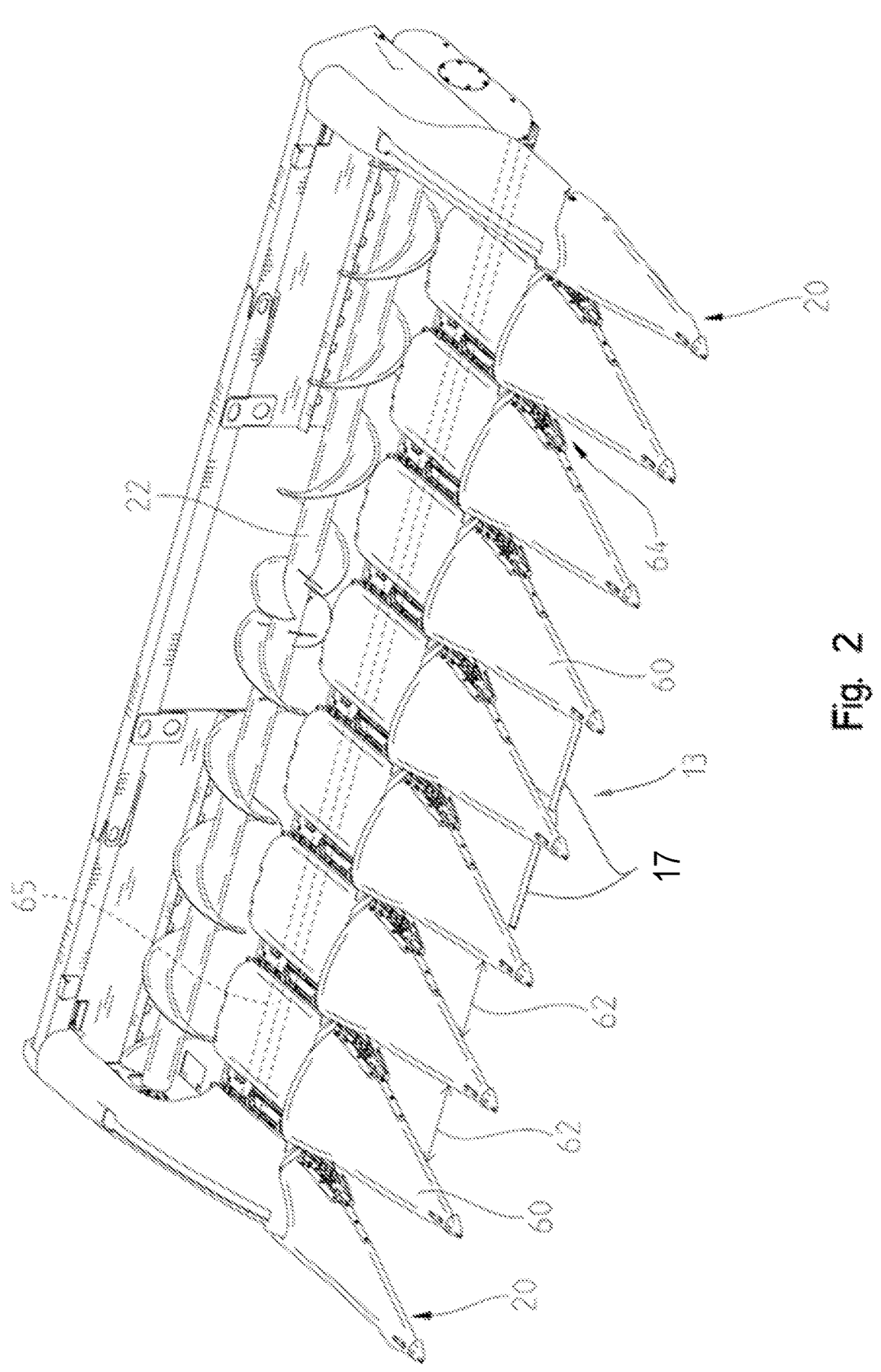
FIG. 2 is a perspective view of an exemplary corn header for the agricultural machine shown in FIG. 1.

As further illustrated in FIG. 2, the corn header 18 includes a plurality of crop row dividers 20 and the crop auger assembly 22, each being coupled to a frame 65. Each of the crop row dividers 20 includes a cone-shaped nose 60, wherein a space 62 is defined between adjacent noses 60. The space 62 can be generally aligned with a corn row by an automatic guidance system 76 (FIG. 3), which can include a row guidance controller 78, which guides the travel of the combine harvester 10 along a row(s) of corn. As the combine harvester 10 moves forward, corn stalks are directed to a deck assembly, also identified as a row unit 64.

As seen in FIG. 2, an external sensor 13 can be mounted to one or more of the crop dividers 20. The external sensor 13 can be adapted to detect at least a presence of crop in front of the path of travel of the agricultural machine 10. Thus, a variety of different types of sensors can be utilized for the external sensor 13, including, for example, an optical row sense device that may utilize a camera system, a radar sensor, and/or a mechanical sensor, among other types of sensors. For example, FIG. 2 illustrates an external sensor 13 in the form of a mechanical row sensor 98 (FIG. 3) that comprises two movable arms 17, each arm 17 being mounted to opposite sides of the same crop divider 20. Alternatively, according to other embodiments, each arm 17 can be mounted on different crop dividers 20, and extend toward another, neighboring or adjacent crop divider 20.

The arms 17 are positioned and oriented to contact or otherwise engage the crops, and moreover, engage crops in the crop rows as the agricultural machine 10 moves in the forward operating or travelling direction 15. According to certain embodiments, each arm 17 extends into the space 62 and towards the adjacent crop divider 20 such that the arm 17 is generally parallel to the ground surface that is beneath the wheels 14, as well as generally perpendicular to the forward operating or travelling direction 15 of the agricultural machine 10. Additionally, the arms 17 can be constructed form a variety of materials so that the arms 17 can resiliently accommodate bending, deflection and/or deformation of the arms 17. Thus, the arms 17 can, for example, be constructed from, or otherwise comprise, an elastomer, an elastically deformable material, a resilient material, or a flexible material, as well as combinations thereof, among other materials.

Additionally, according to certain embodiments, the arms 17 can be biased to a generally forward position and/or orientation by a biasing element, such as, for example, a spring. Thus, during engagement of an arm 17 with a crop(s), a force(s) can be exerted against the arm 17 by the crop(s) that at least temporarily can overcome the force of the biasing element such that the arm 17 moves, including, for example, bends, deflects, and/or deforms. Upon removal of such forces, the biasing element can at least assist in returning the arm 17 to the generally forward position.

Referring to FIGS. 2 and 3, according to certain embodiments, the row sensors 98 can include an analog-to-digital converter that converts the movement of each the arms 17 into an electronic signal that is sent to a controller 72 and/or guidance system 76 of a control system 74, such as, for example, a vehicle control unit, of the agricultural machine 10. The guidance system 76, including the row guidance controller 78, can use the data sent by the external sensor 13 to generate signals that are used by a steering controller 80 of the control system 74, as discussed below. Alternatively, or optionally, according to other embodiments, the guidance system 76 of the control system 74, including, for example, the row guidance controller 78 can use the data sent by the external sensor 13 to generate an travel path, such as, for example, a guidance line, on a display 82 (FIG. 5) within the operator's cab 16 that can indicate a path along which an operator is to steer the moving agricultural machine 10 so as to at least attempt to attain a particular alignment of the header 18 with the detected adjacent row(s) of crops.

FIG. 3 is a diagrammatic view of a portion of an exemplary system 100 for guiding the agricultural machine 10 shown in FIG. 1. The system 100 can include the control system 74 of the agricultural machine 10. The control system 74 can include one or more controllers 72 that are configured to execute various control and/or computational functions of the agricultural machine 10. As such, the controller(s) 72 can be communicatively coupled to various sensors, actuators, and other devices within, or remote from, the agricultural machine 10, including, for example external sensors 13, such as, but not limited to, the row sensors 98. Further, the controller(s) 72 can control various operations of the agricultural machine 10, including, for example, control the activation/deactivation of subsystems 160 (FIG. 1) of the agricultural machine 10 as well as at least assist in the agricultural machine 10 being guided in different guidance modes, as discussed below.

In some embodiments, each controller 72 can include one or more processors 73. Each processor 73 can be embodied as any type of processor or other compute circuit capable of performing various tasks such as compute functions and/or controlling the functions of the agricultural machine 10 depending on, for example, the type or intended functionality of the agricultural machine 10. In some embodiments, each processor 73 can be embodied as a single or multi-core processor, a microcontroller, or other processing/controlling circuit. Additionally, in some embodiments, each processor 73 can be embodied as, include, or be coupled to an FPGA, an application specific integrated circuit (ASIC), reconfigurable hardware or hardware circuitry, or other specialized hardware to facilitate performance of the functions described herein. In some embodiments still, each processor 73 can be embodied as a high-power processor, an accelerator co-processor, an FPGA, or a storage controller.

In some embodiments, each controller 72 can include one or more memory devices 71. Each memory device 71 can be embodied as any type of volatile (e.g., dynamic random access memory (DRAM), etc.) or non-volatile memory capable of storing data therein. Volatile memory can be embodied as a storage medium that requires power to maintain the state of data stored by the medium. Non-limiting examples of volatile memory can include various types of random access memory (RAM), such as dynamic random access memory (DRAM) or static random access memory (SRAM). In some embodiments, each memory device 71 can be embodied as a block addressable memory, such as those based on NAND or NOR technologies. Each memory device 71 can also include future generation nonvolatile devices or other byte addressable write-in-place nonvolatile memory devices. Additionally, in some embodiments, each memory device 71 can be embodied, or otherwise include, a memory device that uses chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. Each memory device 71 can refer to the device itself and/or to a packaged memory product. In some embodiments still, 3D crosspoint memory can comprise a transistor-less stackable cross point architecture in which memory cells sit at the intersection of word lines and bit lines and are individually addressable and in which bit storage is based on a change in bulk resistance. In some embodiments yet still, all or a portion of each memory device 71 can be integrated into the processor(s) 73. Regardless, each memory device 71 can store various software and data used during operation such as task request data, kernel map data, telemetry data, applications, programs, libraries, and drivers.

The control system 74 can also include a location system 94 that can include the GPS 70. The GPS 70 can be integrated with the electrical components of the control system 74 (e.g., as depicted in FIG. 3), or included as an accessory that may be added on to the agricultural machine 10. As seen in FIG. 1, the receiver 11 of the GPS 70 is illustratively mounted on a top portion of the operator's cab 16 of the agricultural machine 10. However, in other embodiments, the receiver 11, as well as the GPS 70, can be mounted in a variety of other suitable locations, such as on another portion of the agricultural machine 10, or on an agricultural implement that may be coupled to, and/or towed by, the agricultural machine 10, among other locations. The GPS 70 can provide information to the controller 72 or other portions of the control system 74 that indicates at least a location of the agricultural machine 10.

Information obtained by the location system 94, including the GPS 70, regarding the location of the agricultural machine 10 can be provided to guidance system 76 of the control system 74. Such information can, at least at certain times, be periodically or relatively continuously provided to the guidance system 76 so that the guidance system 76 has information that at least generally indicates the current location of the agricultural machine 10 and/or information to compare with previously received information to determine possible changes in the location of the agricultural machine 10. The guidance system 76 can be embodied as hardware, firmware, software, virtualized hardware, emulated architecture, and/or a combination thereof.

According to certain embodiments, the guidance system 76 can be configured to at least determine a path of travel for the agricultural machine 10 through a field, including, for example, a path of travel while the agricultural machine 10 is, or is not, performing an agricultural operation. Additionally, or alternatively, the guidance system 76 can utilize a stored guidance line, or operator inputted guidance plan, from which the guidance system 76 can generate commands or signals for steering and/or guiding the movement of the agricultural machine 10. According to certain embodiments, the guidance system 76 provides an automated guidance system, such as, for example, AutoTrac™ and/or Auto-Trac™ Rowsense™, among others. Further, according to such an embodiment, a user can at least initially provide some information for the guidance system 76, such as, for example, via an input/output (I/O) device 90, including, but not limited to, a keyboard, mouse, touch screen, and/or display, in connection with at least initial setup of a guidance plan. For example, the user can provide information via the I/O device 90 regarding a travel track, such as, for example, whether particular locations that the agricultural machine 10 is to be automatically guided while traveling is a straight line, bend, and/or curve, an indication of starting and end points for such travel, and/or row or track spacing, among other information.

During operation of the agricultural machine 10, the automated guidance system 76 can operate in different guidance modes that utilize different input information in connection with guiding and/or steering the travel of the agricultural machine 10. For example, in at least certain situations, the guidance system 76 can operate in a first guidance mode, which can, for example, correspond to a GPS guidance mode. In the GPS guidance mode, the guidance system 76 can utilize information obtained by the GPS 70 to guide the path of travel of the agricultural machine 10 and/or to make adjustments in a planned path of travel of the guidance of the machine 10. For example, in the GPS guidance mode, the guidance system 76 can utilize information being received via the GPS 70 in connection controlling, or guiding, the movement of the agricultural machine 10 such that the path of travel 15 of the agricultural machine 10 is along a guidance line that was previously determined and/or retrieved by the guidance system 76 and/or the control system 74, or a guidance line that was generated by the guidance system 76. Such guidance by the guidance system 76 can include generating commands for the steering controller 80 of the control system 74 that can be used to control the orientation and/or turning, if any, and/or of the front and/or rear wheels 14 and/or associated axels relative to the ground surface so that the agricultural machine 10 moves along the guidance line or another selected or determine path of travel.

The guidance system 76 can also operate in a second guidance mode, such as, for example, a row sense guidance mode that is different than the first guidance mode. For example, in the row sense guidance mode, the guidance system 76 can utilize information from the row guidance controller 78 that was obtained from an external sensor 13. For example, according to embodiments in which the external sensor 13 is a row sensor 98, information regarding detection of contact with the arms 17 of the row sensor 98 can be communicated to the row guidance controller 78. As previously discussed, the row guidance controller 78 can be configured to utilize such contact information to determine at least a position of the crop, and associated crop row, relative to the agricultural machine 10. Using such information, as well as continued detection by the external sensor 13 of contact with crop(s) as the agricultural machine 10 travels in the travelling direction 15, the row guidance controller 78 and/or guidance system 76 can guide the path of travel of the agricultural machine 10. Moreover, information from the external sensor(s) 13 can be utilized by the row guidance controller 78 and/or guidance system 76 to generate commands for the steering controller 80 to steer the agricultural machine 10 in a manner that at least attempts to maintain an alignment of the agricultural machine 10 with the oncoming crops and/or the associate crop row(s).

According to certain embodiments, the second guidance mode can be a hybrid mode that can utilize sensor fusion. For example, in addition to the guidance system 76 utilizing input from the external sensors 13, the guidance system 76 can also, similar to the GPS guidance mode, utilize information from the GPS 70. According to certain embodiments, the guidance system 76 may place a larger emphasis or weight on information provided by one type of input source, such as, for example, giving large weightage to information received from the external sensor(s) 13 than on information obtained via the GPS 70. Moreover, according to certain embodiments, information from the other type of input source, such as, for example, the GPS 70 may be utilized to make minor adjustments or corrections to guidance determinations made by the guidance system 76 that were made using information obtained via the external sensor(s) 13.

The steering controller 80 can be embodied as hardware, firmware, software, virtualized hardware, emulated architecture, and/or a combination thereof, and can at least assist in controlling one or more steering systems of the agricultural machine 10, including, for example, a front steering system and/or a rear steering system of the agricultural machine 10. The steering controller 80 can receive a steering input and/or a speed input. For example, the steering input can relate to the commands or instructions, among other information, generated by the guidance system 76 in connection with the above-discussed first and second guidance modes.

The steering controller 80 can at least assist in controlling one or more steering systems of the agricultural machine 10, including, for example, a front steering system and/or a rear steering system of the agricultural machine 10. The steering controller 80 can also provide commands from controlling a steering system(s) of an implement or tool, if any, that may be coupled or attached to the agricultural machine 10. Thus, for example, in at least some embodiments, the steering controller 80 can operably, and independently, control both a front steering system and a rear steering system of an agricultural machine 10. Such control of one or more steering systems of the agricultural machine 10 using the steering controller 80 can include controlling electronic steering systems. For example, the steering controller 80 can provide signals to operate one or more electric motors and/or actuators that are coupled to, and control the turning and/or the driving of, the front or rear wheels 14 and/or an associated front or rear axle of the agricultural machine 10. Alternatively, for hydraulic steering systems, the steering controller 80 can control the flow of a steering fluid utilized in connection with turning and/or driving the front or rear wheels 14 and/or an associated front or rear axle of the agricultural machine 10. Thus, such control can include the steering controller 80 generating signals that control the operation of a pump(s) and/or the control opening/closing of valves that are used in connection with controlling the flow of the steering fluid.

Figure 4:
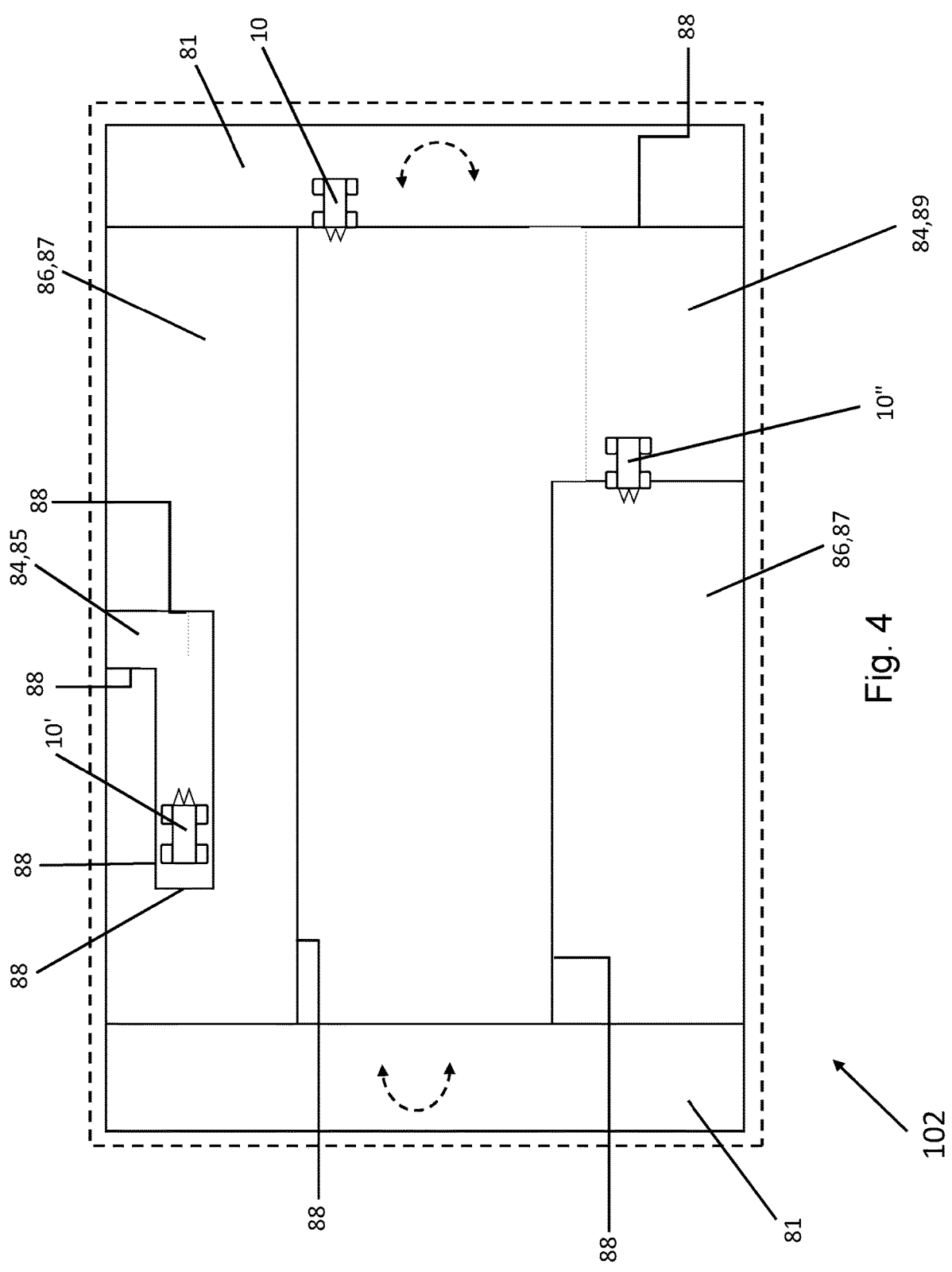
FIG. 4 is an exemplary coverage map of field, and which illustrates representations of agricultural machines traveling through identified coverage areas and non-coverage areas.

The mapping unit 96 of the control system 74 can also be embodied as hardware, firmware, software, virtualized hardware, emulated architecture, and/or a combination thereof, and can at least assist in generating, and/or updating, a coverage map 102 (FIG. 4). Referencing the exemplary coverage map 102 shown in FIG. 4, the coverage map 102 can indicate the location and/or boundaries 88 of coverage areas 84, as well as the location of non-coverage areas 86, such as, for example, crop areas 87. According to certain embodiments, crop areas 87 can include areas containing crops, and/or areas in which an agricultural machine 10 is to perform a particular agricultural operation, such as, for example, harvest, spray, or bale crops, among other agricultural operations. Conversely, a coverage area 84 can include an area in which crops are absent, such as, for example, waterways and/or roadways 85, and harvested locations 89 at which crops have been removed, or in which a particular agricultural operation, such as harvesting, has already been performed. Thus, with respect to a coverage map 102 for tasks relating to harvesting crop, the non-coverage area(s) 86 can indicate the area(s) in which crop is located that is to be harvested, and the coverage area(s) 84 can indicate the area(s) in crop has been harvested or otherwise is not present. The coverage map 102 can also indicate locations 81 at which the agricultural machine 10 is, or will be, automatically operated by the guidance system 76 to make a turn or/otherwise experience a change in direction of travel.

Accordingly, the mapping unit 96 of the control system 74 can be configured to generate a coverage map 102 and/or update an existing coverage map 102 that is being maintained by the mapping unit 96 and/or the controller 72 of the control system 74, and/or by a central system 120. Such a coverage map 102 can at least initially indicate the non-coverage area(s) 86, such as crop areas 87, in which the agricultural machine 10 is to perform agricultural operations, such as, for example, harvest crop. Further, the mapping unit 96 can track the areas in which the agricultural machine 10 performs such agricultural operations, such as, for example, via use of location information from the location system 94 and/or GPS 70. By tracking such operations, the mapping unit 96 can update the coverage map 102 by indicating the non-coverage area(s) 86 that have become coverage areas 84, and/or via changing the boundaries of the non-coverage area(s) 86.

While FIG. 3 illustrates the controller 72, communication unit 92, guidance system 76, location system 94, steering controller 80, external sensor 13, and mapping unit 96 as separate components, according to certain embodiments, one of more of these components can be grouped together, including, for example, being part of the guidance system 76.

According to certain embodiments, coverage maps 102 can be communicated by the control system 74 to a central system 120, and/or vice versa. Such communication can occur in a variety of manners, including, for example, via use of communication units 92, 122 of the control system 74 and central system 120 respectively. The communication units 92, 122 can be configured for wired and/or wireless communications between the control system 74 and the central system 120. Such wireless communications can occur using proprietary and/or non-proprietary wireless communication protocols, including, but not limited to, Wi-Fi, ZigBee, Bluetooth, radio, or near-field communications, among other communication protocols. According to certain embodiments, the communication units 92, 122 can each comprise a transceiver.

Similar to the control system 74, the central system 120 can include a mapping unit 124 that can generate, store, and/or update one or more coverage maps 102. For example, according to certain embodiments, the communication unit 124 can receive information from one or more agricultural machines 10, 10', 10" (FIG. 4) that can provide information for the coverage map 102 that at least indicates areas that are becoming, or have become, coverage areas 84, including locations, coordinates, and/or boundaries 88 of the coverage area(s) 84. Such information can be provided to the central system 120 at a variety of different times, including, for example, generally in real time and/or upon completion of one or more farming operation(s) by an agricultural machine 10, 10', 10".

Similar to the controller 72, processor 73 and memory device 71 of the control system 74, the central system 120 can also include at least one controller 126 having a processor 128 and a memory device 130. The type of processor 128 and memory device 130 of the central system 120 may, or may not, be similar to those discussed above with respect to the controller 72 of the control system 74. Further, coverage maps 102, including updated coverage maps 102 received from one or more agricultural machines 10, 10', 10", can be stored and/or maintained in the memory device 130 or a database 132 of the central system 120. The central system 120 can also include one or more input/output (I/O) devices 134, including, but not limited to, a keyboard, mouse, touch screen, and/or display, among other I/O devices.

Figure 6:
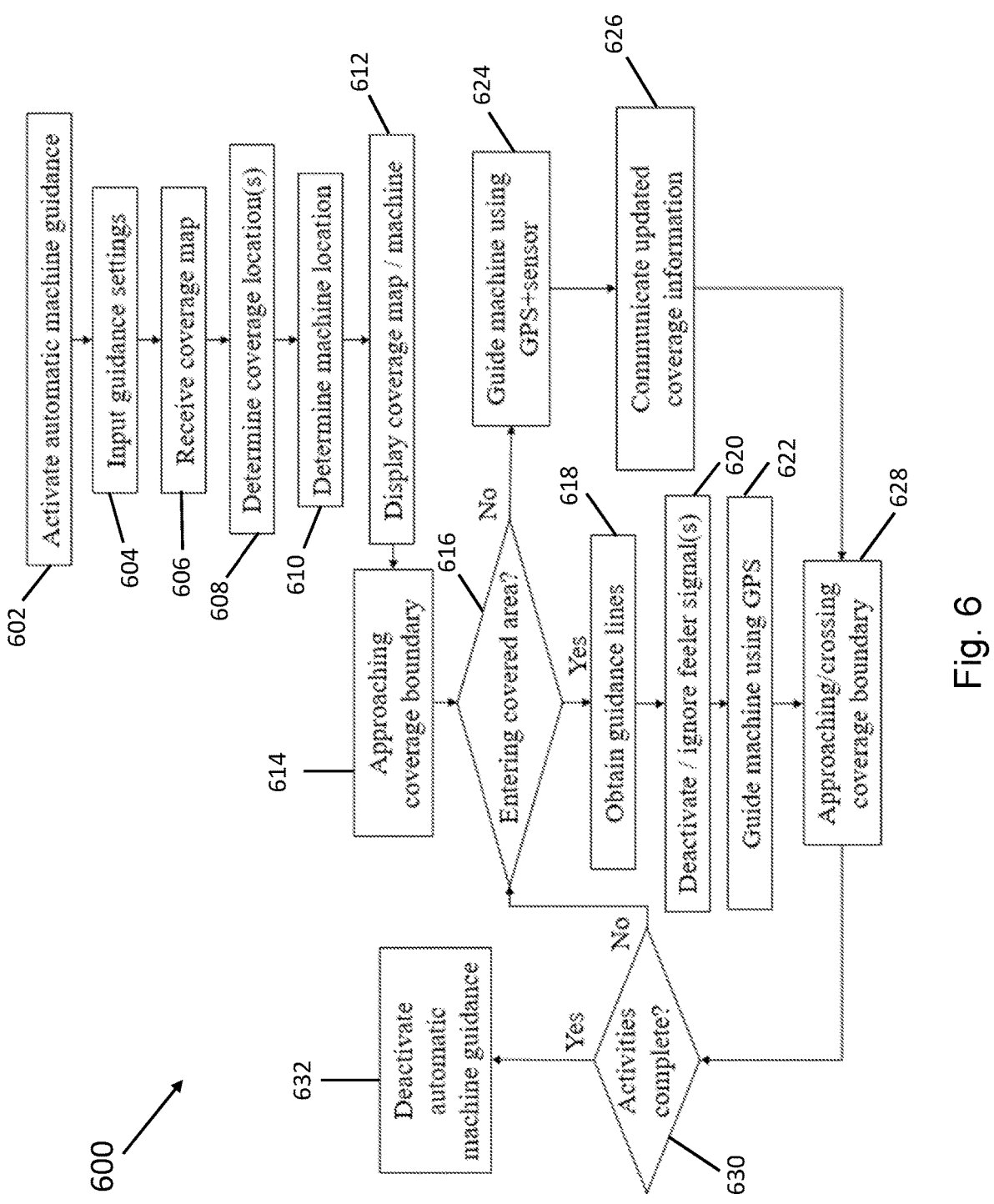
FIG. 6 is a simplified flowchart of a method that can be performed by the system depicted in FIG. 3 for changing the guidance mode of an agricultural machine in response to detection of an approaching entrance/exit into/from a coverage area and/or a non-coverage area.

FIG. 6 is a simplified flowchart of a method 600 for automated guidance of an agricultural machine 10 that can be performed by the system 100 that is diagrammatically depicted in FIG. 3. The method 600 corresponds to, or is otherwise associated with, performance of the blocks described below in the illustrative sequence of FIG. 6. It should be appreciated, however, that the method 600 can be performed in one or more sequences different from the illustrative sequence.

At block 602 an operator can activate automatic vehicle guidance for the agricultural machine 10. For example, using the I/O device 90, an operator can provide a signal or other command indicating that the guidance system 76 is to guide the movement or travel of the agricultural machine 10 using, for example, AutoTrac™ from John Deere. In at least some instances, at block 604, the operator can also input settings for the guidance of the agricultural machine 10, including, for example, identification of a track type, distance of travel, start and end locations, and/or a direction of travel, as well as possible information regarding the distance or spacing between rows. Additionally, according to certain embodiments, at block 604, the operator can select a guidance mode, such as, for example, select between a first, GPS guidance mode, or a second, row sense guidance mode, among other guidance modes.

At block 606, the control system 74 can send a signal via the communication unit 92 to the communication unit 122 of the central system 120 inquiring as to whether a coverage map 102 exists for an area and/or field(s) in which the agricultural machine 10 is, or will be, performing an agricultural operation(s). Stored coverage maps 102 can generally current in that the coverage maps 102 can provide an indication of relatively recent and/or current locations, if any, of coverage areas 84 and/or non-coverage areas 86, as well as locations of associated boundaries 88 therebetween in the field(s) or areas in which the agricultural machine 10 is, or will be, traveling. According to certain embodiments, each agricultural machine 10, 10', 10" performing an agricultural operation(s) in the same general area and/or field(s) may generally continuously, or in relatively close time intervals, communicate updated information to the central system 120 that allows the central system 120 to generally maintain, and update, the coverage map 102 in, or close to, real time. Thus, according to other embodiments, the current coverage map 102 can be current with respect to the latest update that the central system 120 has received from an agricultural machine 10, 10', 10" regarding the location(s) of areas that have been transformed, or changed, from non-coverage areas 86 to coverage areas 84, including, for example, areas in which crops have been harvested, sprayed, and/or baled. Therefore, the extent to which a coverage map 102 may be current or up to date can, at least in part, be based on the timing the central system 120 has received information indicating the location(s) at which an agricultural operation(s) was/were performed. Alternatively, if a relatively current coverage map 102 does not exist, the central system 120 and/or control system 74 can generate a new coverage map 102 at block 606 that can indicate areas in which crop was planted, or is otherwise expected to be present, and/or areas in which crop may be known to not be present. Thus, for example, if a coverage map 102 has not been updated for a certain period of time, such as, for example, within a certain number of days, weeks, and/or months, prior coverage maps 102 can be determined to be outdated and/or designated to no longer be used, and new coverage maps 102 may therefore be generated.

At block 608, the control system 74 and/or the guidance system 76 can identify the location of the coverage areas 84 and/or non-coverage areas 86 on the coverage map 102. Additionally, using information from the GPS 70, at block 610, the guidance system 76 can determine a location of the agricultural machine 10, and, moreover can determine the location of the agricultural machine 10 relative to the location(s) of the non-coverage area(s) 86 and/or coverage area(s) 84 that are identified by the coverage map 102. Using such information, at block 612 the control system 74, including, for example, the controller 72, can depict the location of the agricultural machine 10 relative to adjacent coverage and/or non-coverage areas 84, 86, as indicated by the coverage map 102, on an I/O device 90, such as, for example, a display 82 (FIG. 5) in the operator's cab 16.

At block 614, before, as well as during, travel of the agricultural machine 10, the guidance system 76 can detect that the agricultural machine 10 is approaching a coverage boundary 88 between a coverage area 84 and a non-coverage area 86. According to certain embodiments, detection of the agricultural machine 10 approaching a coverage area 84 or a non-coverage area 86, and/or the associated coverage boundary 88, can be sufficiently in advance of crossing such coverage boundary 88 so that a change in guidance mode, such as, for example, a change from the first guidance mode to the second guidance mode, or vice versa, can be promptly executed in a manner than may not interfere with an associated agricultural operation and/or accurate guidance of the agricultural machine. Additionally, such early timing of switching of the guidance mode can also assist in preventing at least temporary deactivation of automatic vehicle guidance when passing across such boundaries 88 or coverage and/or non-coverage areas 84, 86.

Determination that the agricultural machine 10 is approaching a coverage boundary 88, and/or is exiting or entering a coverage area 84 and/or non-coverage area 86, can be based, at least in part, on the locations of such boundaries 88 or areas 84, 86, as indicated by the coverage map 102, relative to the location of the agricultural machine 10, as detected via information from the GPS 70. Upon approaching, reaching, and/or crossing such a boundary 88, at block 616 the guidance system 76 can determine whether the agricultural machine 10 is, or will be, entering or exiting a coverage area 84 and/or a non-coverage area 86. A determination of the type of area, namely a coverage area 84 or a non-coverage area 86, that the agricultural machine 10 is, or will be, entering/exit can cause the guidance system 76 to automatically switch, or change, from operating in one guidance mode to operating in another, different guidance mode.

Figure 5:
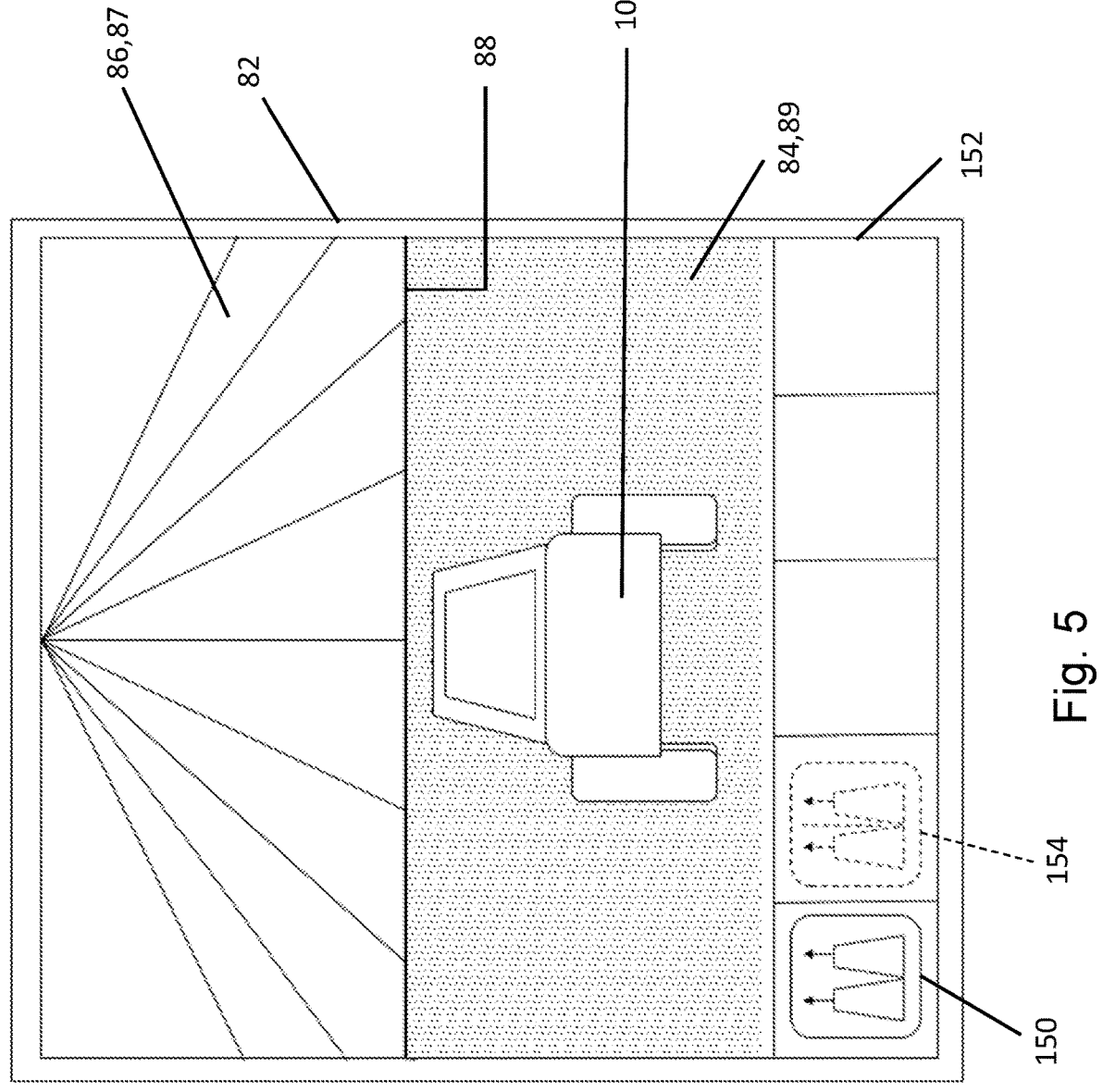
FIG. 5 is an exemplary depiction of information displayed on a display of an agricultural machine that includes guidance modes for passage of the agricultural machine in coverage, and non-coverage, areas.

For example, upon determining at block 616 that the agricultural machine 10 is, or will be, entering a coverage area 84 and/or exiting a non-coverage area 86, the guidance system 76 can automatically operate in a first guidance mode, such as, for example, a GPS guidance mode, as discussed above. To the extent such an automatic operation in the first guidance mode involves a change in from a different guidance mode, such a change can happen at a variety of different times. For example, according to certain embodiments, the change to the first guidance mode can occur prior to, upon, and/or after the agricultural machine 10 enters a coverage area 84. Additionally, the operator of the agricultural machine 10 can also be informed that the guidance system 76 is operating in the first guidance mode, such as, for example, via illumination of a first guidance icon 150 on a header display 152 of the display 82, as seen in FIG. 5.

Operation of the agricultural machine 10 in the first or GPS guidance mode can include, at block 618, retrieving, or, alternatively, generating, one or more guidance lines along which the guidance system 76 is to, via at least information from the GPS 70 and generating commands for the steering controller 80, guide the movement or travel of the agricultural machine 10. Thus, according to certain embodiments, the guidance line can be predetermined or preexisting guidance line that is stored by the guidance system 76 and/or the central system 120. For example, the guidance line can be one or more lines or paths that were previously taken by the agricultural machine 10 as the agricultural machine 10, or another agricultural machine 10', 10", performed an agricultural operation that transformed the area from a non-coverage area 86 into a coverage area 84.

Additionally, or alternatively, the guidance line can be a path of travel determined by the mapping unit 96 and/or guidance system 76 of the control system 74 and/or the mapping unit 124 of the central system 120 for the agricultural machine 10 to cross the coverage area 84 so as to reach a particular non-coverage 86. For example, an operator can select a particular non-coverage area 86, such as, for example, a non-coverage area 86 having a particular crop. Alternatively, the operator or guidance system 76 can identify the closest non-coverage area 86. In such situations, the guidance system 76 can be configured to determine a guidance line for the agricultural machine to follow, via automatic guidance, in traveling to such a selected non-coverage area 86.

As previously discussed, in at least some situations in which coverage areas 84 correspond to areas in which crops have already been harvested, or crop is otherwise not expected to be present, information from the external sensor (s) 13 can be relatively unreliable. Thus, when operating in the first or GPS guidance mode, the guidance system 76 can, at block 620, be operated in a manner in which the guidance system 76 does not utilize information received, if any, by or from the row guidance controller 78 and/or the external sensor(s) 13 in guiding the travel or movement of the agricultural machine 10. Thus, when operating in the first or GPS guidance mode, according to certain embodiments, the guidance system 76 can deactivate and/or signals or information from the external sensor(s) 13 and/or row guidance controller 78 can be ignored or afforded no weight in determining commands for, or otherwise controlling the guidance and/or steering the agricultural machine 10. Accordingly, at block 622, the guidance system 76 can proceed with guiding the agricultural machine 10 along at least a portion of the coverage area 84 using the first, GPS guidance mode.

Conversely, if at block 616 the guidance system 76 determines that the agricultural machine 10 is entering a non-coverage area 86 and/or is exiting a coverage area 84, then at block 624 the guidance system 76 can automatically guide the agricultural machine 10 in the second guidance mode, such as, for example, the row sense guidance mode. To the extent operating in the second guidance mode will involve a change in guidance modes, such as changing from the first guidance mode, the change can occur at a variety of different times, including, for example, before, during, or after entering the non-coverage area 86 and/or crossing the associated coverage boundary 88. Following such a change, the operator of the agricultural machine 10 can also be informed that the guidance system 76 is operating in the second guidance mode by the appearance of a second guidance icon 154 on the header display 152 of the display 82, as seen in FIG. 5.

As previously discussed, in the row sense guidance mode, the guidance system 76 can utilize information from the external sensor(s) 13 and/or the row guidance controller 78, including, for example, information regarding detection of crops contacting the external sensor(s) 13, in determining commands for, or otherwise controlling, guidance and/or steering of the agricultural machine 10. Further, as also previously discussed, according to certain embodiments, the row sense guidance mode can be a hybrid mode in which sensor fusion is utilize such that, in addition to information obtained from the external sensor(s) 13, guidance decisions by the guidance system 76 can also at least partially be based on location information from the GPS 70.

According to certain embodiments, while operating in the second guidance mode, among other times, the control system 74, including, for example, the mapping unit 96, can maintain information regarding the area(s) in which the agricultural machine 10 is/has performing/performed an agricultural operation. For example, as an agricultural machine 10 traverses a non-coverage area 86, such as, for example, a crop area 87 while harvesting the crop, the area(s) along which the agricultural machine 10 performs such a harvesting operation can be changed from being a non-coverage area 86 to a coverage area 84. In such situations, the control system 74, including the mapping unit 96, can maintain a record of such changes, as well as the location(s) of such changes via use of information from the GPS 70.

At block 626, to the extent not previously communicated, information regarding the agricultural operation(s) performed, or being performed, can be communicated via the communication units 92, 122 to the central system 120. Thus, such communication to the central system 120 can occur while, and/or after, the agricultural machine 10 is/has performing/performed the agricultural operation in the non-coverage area 86. Further, such communicated information can comprise information regarding areas that have, or are to be, changed on the coverage map 102 from non-coverage areas 86 to coverage areas 84. Additionally, updates to the coverage map 102 at the central system 120 can, according to certain embodiments, be a triggering event that can facilitate a communication(s) from the central system 120 to the control systems 74 of other agricultural machines 10, 10', 10" that can facilitate updates to, or in, the coverage map(s) 102 that are being used by those machines 10, 10', and 10".

Following operation of the agricultural machine 10 in the first guidance mode at block 622, or the second guidance mode at block 624, the guidance system 76 can detect from the coverage map 102 at block 628 that the agricultural machine 10 is again approaching, crossing, and/or has passed a coverage boundary 88 and/or a coverage area 84 and/or a non-coverage area 86.

According to certain embodiments, at block 630, a determination can be made as to whether any additional agricultural operations are to be performed. For example, at block 630, a determination can be made as to whether the agricultural machine 10 is presently to proceed with performing agricultural operations in any remaining crop areas 87 that are detected, such as, for example, by the guidance system 76, on the coverage map 102. If the agricultural machine 10 is to continue performing agricultural operations, then the method 600 can return to block 616, where a determination can be made as to whether the agricultural machine 10 is, or is not, approaching and/or entering a coverage area 84 and/or a non-coverage area 86. However, if the agricultural machine 10 is not, at least currently, to continue performing agricultural operations, the process can proceed to block 632, where automatic vehicle guidance by the guidance system 76 can be deactivated.

Figure 7:
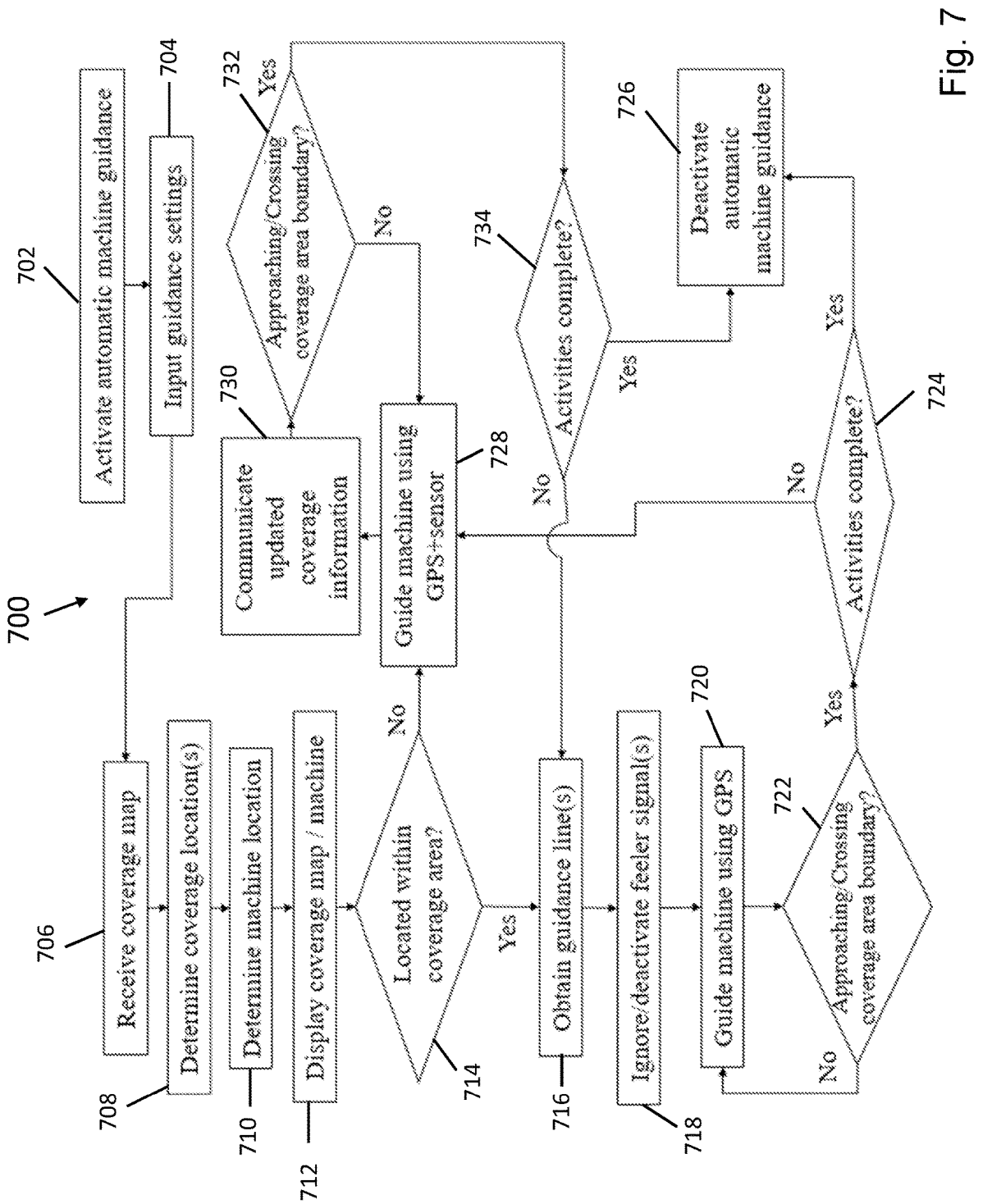
FIG. 7 is another simplified flowchart of a method that can be performed by the system depicted in FIG. 3 for changing the guidance mode of an agricultural machine in response to detection of an approaching entrance/exit into/from a coverage area and/or a non-coverage area.

FIG. 7 is a simplified flowchart of a method 700 for automated guidance of an agricultural machine 10 that can be performed by the system 100 that is diagrammatically depicted in FIG. 3. The method 700 corresponds to, or is otherwise associated with, performance of the blocks described below in the illustrative sequence of FIG. 7. It should be appreciated, however, that the method 700 can be performed in one or more sequences different from the illustrative sequence.

As seen in FIG. 7, automatic vehicle guidance for the agricultural machine 10 can be activated at block 702, and guidance settings can be inputted at block 704. Additionally, a coverage map 102 can be received by the control system 74 from the central system 120 via the communication units 92, 122 at block 706, from which the location of coverage areas 84 and/or non-coverage areas 86 can be determined at block 708. Further, the location of the agricultural machine 10 can be determined at block 710, and displayed at block 712. As seen, blocks 702-712 of the method 700 are similar to blocks 602-612, respectively, of the method 600 shown in FIG. 6. Accordingly, the above discussions disclosure regarding blocks 602-612 of FIG. 6, also are applicable to the similar features of blocks 702-712, respectively.

Using the coverage map 102 and the GPS 70, the guidance system 76 can determine, at block 714, whether the agricultural machine 10 is located in a coverage area 84 or a non-coverage area 86, such as, for example a crop area 87. Thus, for example, the determination at block 714 can correspond to whether automatic vehicle guidance was activated at block 702 while the agricultural machine 10 is located in either a coverage area 84 or a non-coverage area 86. If at block 714 a determination is made, such as, for example, by the guidance system 76, that the agricultural machine 10 is located in coverage area 84, then the guidance system 76 can operate in the first guidance mode, which again, in this example, is the GPS guidance mode.

If the guidance system 76 determines that the agricultural machine 10 is located in a coverage area 84, then the guidance system 76 can operate the agricultural machine in an associated first guidance mode, such as, for example, the previously discussed GPS guidance mode. Thus, in manners at least similar to those discussed above with respect to block 618 of the method 600 shown in FIG. 6, at block 716 the guidance system 76 can obtain one or more preexisting or predetermined guidance lines, or determine one or more guidance lines, for the agricultural machine 10 to be guided along while traveling across at least a portion of the coverage area 84. Thus, for example, the guidance lines obtained at block 718 can be used to direct the agricultural machine 10 to a non-coverage area 86, such, as for example, a crop area 87. Again, whether, and which, non-coverage area 86, if any, that the guidance system 76 is to guide the agricultural machine 10 can be based on a variety of considerations, including, for example, a selection by the operator, properties of the non-coverage area 86, including properties relating to the crops container therein, and/or the relative closeness of the non-coverage area 86 to the present location of the agricultural machine 10. In manners at least similar to those discussed above with respect to block 620, for operation using the GPS guidance mode, at block 718 signals from the row guidance controller 78 and/or the external sensor(s) 13 can be ignored, at least be temporarily deactivated, and/or afforded little or no weight or consideration by the guidance system 76.

Therefore, according to at least certain embodiments, at block 720, the agricultural machine 10 can be operated in an automatic guidance mode in which the guidance system 76 guides the agricultural mode using information from the GPS 70, and not information from the external sensor(s) 13 and/or row guidance controller 78. During such guidance, the guidance control system 74 can monitor the location of the agricultural machine 10 with respect to coverage boundaries 88, coverage areas 84, and/or non-coverage areas 86 in connection with determining at block 722 whether the agricultural machine is approaching, crossing, exiting, or has crossed such a coverage boundary 88, coverage area 84, and/or non-coverage area 86. According to certain embodiments, such determination can occur in advance of reaching such a coverage boundary 88, exiting the coverage area 84, and/or entering the non-coverage area 86 such that, prior to, or upon, reaching the boundary 88, the guidance system 76 has, or is ready to, switch to a different guidance mode, such as, for example, to the second or row sense guidance mode. A premature switching of the guidance mode before exiting the coverage area 84 and/or entering a non-coverage area 86 can also assist in preventing at least temporary deactivation of automatic vehicle guidance when passing across such coverage boundaries 88 or areas 84, 86.

Additionally, similar to block 630, at block 724, in connection with determining whether the agricultural machine 10 will be exiting a coverage area 84, a determination can be made as to whether agricultural operations are complete. For example, at block 724, a determination can be made as to whether the agricultural machine 10 is to proceed with performing an agricultural operation in a non-coverage area 86. If activities are complete, then at block 726, automatic vehicle guidance, namely automated guidance using the guidance system 76, can be deactivated. However, if activities, such as agricultural operations, are determined at block 724 to not yet be completed, then, according to certain embodiments, the guidance system 76 can proceed with operating under a different guidance mode at block 728, as discussed below.

Returning to block 714, if at block 714 a determination is made, such as, for example, by the guidance system 76, that the agricultural machine 10 is located in a non-coverage area 86, then, at block 728 the guidance system 76 can operate in the second guidance mode, which again, in this example, is the row sense guidance mode. As discussed above, according to certain embodiments, the row sense guidance mode can be a hybrid, or sensor fusion mode in which the guidance system 76 uses information from both the external sensor 13 and the GPS 70 in guiding and/or generating signals to steer the agricultural machine 10. Further, in at least manners and timing similar to that discussed above with respect to block

626 of FIG. 6, at block 730 of the method 700, the control system 74 can communicate via the communication unit 92 updated information regarding one or more coverage areas 84 and/or non-coverage areas 86 to the communication unit 122 of the central system 120. The central system 120 can then record and/or store such information such that the central system 120 can update the coverage map 102 that may be stored in the database 132 or at another location of the central system 120.

At block 732, a determination can be made as to whether the agricultural machine 10 is, or will be, approaching or crossing a coverage boundary 88, entering a coverage area 84, and/or exiting the non-coverage area 86. In the event a determination is made that no such crossing or approach is occurring, the guidance system 76 can continue at block 728 with operating in the second, row sense guidance mode. However, if a determination is made that such crossing or approach is occurring, then at block 734, and similar to block 724, a determination can be made by the guidance system 76 and/or the operator as to whether the agricultural machine 10 is, or is not, at least at the current time, to perform any other agricultural operations. If, no other agricultural operations are to occur, then at block 726, automatic vehicle guidance, namely automated guidance using the guidance system 76, can be deactivated. However, if at block 734 agricultural operations are determined to not yet be completed, then, according to certain embodiments, the guidance system 76 can proceed with operating under a different guidance mode, namely, the first guidance mode. As discussed above, a switch or change from the second guidance mode to the first guidance mode can occur at a variety of different times, including, for example, prior to, upon, or after reaching the coverage boundary 86, exiting the non-coverage area 86, and/or entering the coverage area 84. Further, as seen in FIG. 7, prior to guiding the agricultural machine 10 using the first mode at block 720, one or more guidance lines can be retrieved and/or generated at block 716.

Figure 8:
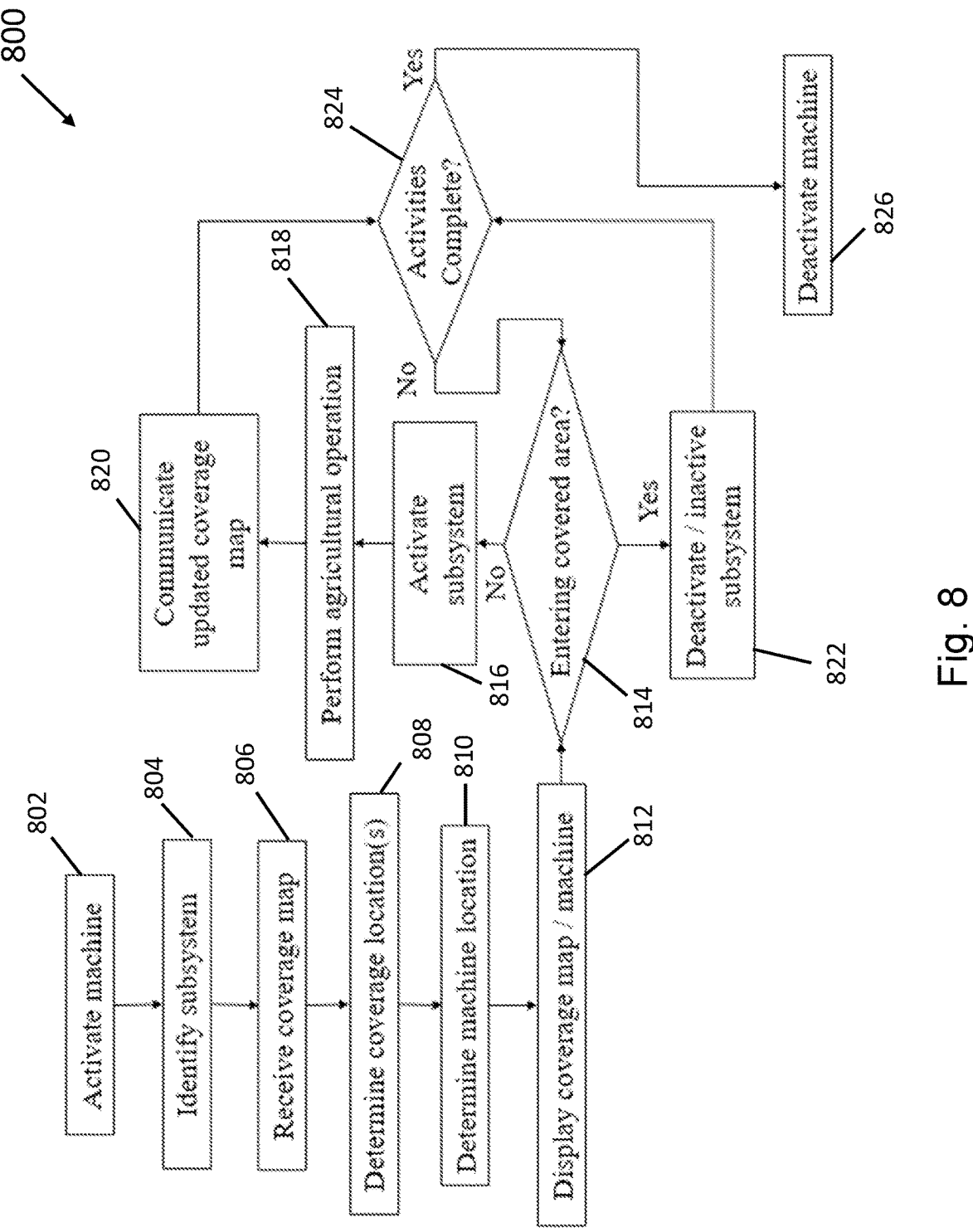
FIG. 8 is a simplified flowchart of a method that can be performed by the system depicted in FIG. 3 for activating/deactivating one or more subsystems of an agricultural machine in response to detection of an approaching entrance/exit into/from a coverage area and/or a non-coverage area.

FIG. 8 is a simplified flowchart of a method 800 for automated activation and deactivation of one or more subsystems 160 of an agricultural machine 10 that can be performed using the system 100 that is diagrammatically depicted in FIG. 3. The method 800 corresponds to, or is otherwise associated with, performance of the blocks described below in the illustrative sequence of FIG. 8. It should be appreciated, however, that the method 800 can be performed in one or more sequences different from the illustrative sequence.

As seen in FIG. 8, at block 802, the agricultural machine 10 can be activated. The agricultural machine 10 can have one or more subsystems 160 that are utilized to perform a particular agricultural operation. The types of available subsystems 160 can therefore vary for different types of agricultural machines 10. Moreover, the subsystems 160 can be portions of the agricultural machine 10 that are activated and/or utilized while the agricultural machine 10 performs an agricultural operation, but that can otherwise be deactivated without preventing travel or movement of the agricultural machine 10 while the agricultural machine 10 is not performing an agricultural operation. Thus, for example, according to certain embodiments, the subsystem(s) 160 can be dedicated to the performance of a particular agricultural operation by the agricultural machine 10 while the agricultural machine 10 is in a non-coverage area 86, but which operation may be unnecessary and/or not beneficial while the agricultural machine 10 travels through a coverage area 84 wherein an agricultural operation is not being performed.

For example, with respect to the combine harvester shown in FIGS. 1 and 2, one subsystems 160 can include a harvesting subsystem 160 (FIG. 1) that can comprise, for example, one or more of the crop auger assembly 22, slope conveyor 24, rotor 36, screw conveyor 54, and/or overhead conveyor, among other components. Moreover, such a harvesting subsystem 160 can be adapted generally for the limited purpose of performing agricultural operations directed to harvesting crop from a non-coverage, or crop, area 86, 87. However, as coverage areas 84 may be areas in which crop is not, or is no longer, present for harvesting, operation such a harvesting subsystem 160 may be unnecessary as the combine harvester travels across coverage areas 84. Similarly, according to embodiments in which the agricultural machine is a baler, one subsystem 160 can be a baling subsystem that can include one or more of a pick-up mechanism that gathers crop material from the ground in a non-coverage area 86, a loading mechanism that feeds crop material from the pick-up mechanism to a baling or compression chamber, and/or a bailing or compression chamber and associate motors or actuators that are operated in connection with compressing the gathered crop material to form a bale. In such an example, the bailing subsystem can perform an agricultural operation relating to baling crop in a non-coverage area 86 where crop is present, while the absence of crop in a coverage area 84 may render operation of the bailing subsystem unnecessary. With respect to these examples, during at least times in which the agricultural machine 10 is traveling through a coverage area 84, operation of such subsystems 160 can result in an unnecessary consumption of energy, as well as unnecessary wear on the associated components of at least the subsystem(s) 160.

Accordingly, at block 804 the operator and/or the control system 74 can select one or more subsystems 160 of the agricultural machine 10 that are to be operated when the agricultural machine 10 is in a non-coverage area 86 but that are not to be operated when the agricultural machine 10 is in a coverage area 84. In at least manners similar to those discussed at blocks 606-610 of the method 600 discussed with respect to FIG. 6, and blocks 706-710 of the method 700 discussed with respect to FIG. 7, at block 806 a coverage map 102 can be received and/or generated, coverage and/or non-coverage areas 84, 86 can be located at block 808, and a location of the agricultural machine 10, including a location relative to the coverage and/or non-coverage areas 84, 88, can be determined at block 810. At block 812, as illustrated by FIG. 5, at least a graphical representation and/or image of a portion of the coverage map 102 and the agricultural machine 10, as well as a representation of a location or position of the agricultural machine 10 along at least a portion of the coverage map 102, can be shown on the I/O device 90, including on the display 82 in the operator's cab 16.

During operation of the agricultural machine 10, the guidance system 76 can, based at least on information from the coverage map 102 and/or the GPS 70, determine whether the agricultural machine 10 is, or will be, entering or exiting a coverage area 84 and/or a non-coverage area 86. If the agricultural machine 10 is determined to be entering a non-coverage area 86, then at block 816, the subsystem(s) 160 identified at block 804 can, if not already activated, be activated. According to certain embodiments, activation of the subsystem(s) 160 can occur prior to entrance into the non-coverage area 86 and/or as the agricultural machine 10 is crossing a coverage boundary 88 so as to ensure that the performance of agricultural operations at block 818 includes the subsystem 160 performing such operations with respect to crops that are at, or in the immediate vicinity of, the coverage boundary 88. Moreover, activation of the subsystem 160 following identification of an upcoming entrance into a non-coverage area 86, and prior to entering the non-coverage area 86, can prevent a delay in the activation of the subsystem 160 that may otherwise result in missed opportunities to perform agricultural operations on/for the crops that are at, and/or are in close proximity of, the coverage boundary 88. Thus, according to certain embodiments, the subsystem 160 can be activated at least a predetermined time period after identification that the agricultural machine 10 will be entering, or is otherwise approaching, a non-coverage area 86, and at least before the agricultural machine 10 enters the non-coverage area 86.

At block 820, the communications unit 92 can be utilized by the control system 74 to provide information regarding the locations in previously identified non-coverage areas 86 that the subsystem 160 performed agricultural operations. Moreover, at block 820, information regarding the location at which agricultural operations were performed can be utilized to identify which areas in the coverage map 102 are to be changed from being a non-coverage area 86 to a coverage area 84. In addition to being recorded on the coverage map 102 being used by the control system 74, including, for example, by the mapping unit 96 and/or the memory device 71, such information can be communicated via the communication units 92, 122 so as to update the coverage map 102 stored or maintained by the central system 120.

Referring again to block 814, in the event a determination is made, such as, for example, by the guidance system 76 and/or controller 72, that the agricultural machine 10 is entering a coverage area 84, then at block 814, the subsystem(s) 160 selected at block 804 can be deactivated. Again, as discussed above, as the coverage area 84 may not contain crop, such as, for example, be an area that was previously harvested, or be a waterway or road, there may be no agricultural operation for the selected subsystem(s) 160 to perform in the coverage area 84. Accordingly, operation of the subsystem(s) 160 in the coverage area 84 may result in an unnecessary consumption of fuel or energy, as well as contribute to avoidable wear in the subsystem 160. The timing of such deactivation of the subsystem 160 can vary. For example, according to certain embodiments, to ensure that subsystem 160 is not prematurely deactivated, and/or opportunities are not missed with respect to agricultural operations being performed in an adjacent non-coverage area 86, deactivation may not occur until the agricultural machine crosses a coverage boundary 88, the agricultural machine 10 is within the coverage area 84, and/or after the agricultural machine 10 has been in the coverage area 84 for a certain predetermined amount of time.

Following at least performing the agricultural operation in a non-coverage area 86 at block 818, or the deactivation or inactivity of the subsystem 160 at block 822, at block 824, a determination can be made as to whether use of the agricultural machine 10 to perform agricultural operations is at least temporarily completed. If not completed, the method 800 can return to determining if the agricultural machine 10 is entering a coverage area 84 and/or a non-coverage area 86. Otherwise, at block 826, the method 800 can at least temporarily conclude with deactivating the subsystem(s) 160 and/or the agricultural machine 10.

As previously discussed, the row guidance controller 78 can be operated in a row sense guidance mode in which information from an external sensor(s) 13 can be utilized by the row guidance controller 78 and/or guidance system 76 to generate commands for the steering controller 80 to steer the agricultural machine 10 in a manner that at least attempts to maintain an alignment of the agriculture machine 10 with oncoming crops and/or the associated crop row(s). Thus, for example, referencing FIGS. 9 and 10, while traveling within a non-coverage area 900 of a field 902, the agricultural machine 10 can use, or otherwise have enabled, the row sense guidance mode to at least assist the agricultural machine 10 in following one or more first crop rows 904 that extend within the non-coverage area 900 in a first direction (as generally indicated by "d₁" in FIG. 9.) Additionally, as previously discussed, the guidance system 76 can also operate in a GPS guidance mode in which the guidance system 76 can utilize information obtained by the GPS 70 to guide the path of travel of the agricultural machine 10 and/or to make adjustments in a planned path of travel of the guidance of the machine 10.

As illustrated in FIGS. 9 and 10, one or both of opposing first and second ends 906, 908 of the non-coverage area 900 of the field 902 can be bordered by first and second headland areas 910, 912, respectively. Further, the first and second headland areas 910, 912 can each be separated from the non-coverage area 900 of the field 902 by an associated boundary 88, which, in this example, can be a headland boundary 914, 916. According to the illustrated embodiment, the first and second headland areas 910, 912 provide an area for at least the agricultural machine 10 to perform an end turn in connection with turn in direction of the agricultural machine 10.

Thus, for example, referencing FIG. 9, while the row guidance controller 78 of the agricultural machine 10 is being operated in the row sense guidance mode, the agricultural machine 10 can be making a first pass 918 in the non-coverage area 900 of the field 902. In this example, during the first pass 918, the row sense guidance mode can be used to guide the travel of the agricultural machine 10 generally along, or generally parallel to, one or more of the first crop rows 904 while traveling in a direction toward, and eventually entering, the first headland area 910. The agricultural machine 10 can then perform an end turn in the first headland area 910 such that the agricultural machine 10 can be oriented to reenter the non-coverage area 900 of the field 902 so as to make a second pass 938 in the non-coverage area 900 of the field 902. With respect to at least the configuration of the exemplary field 902 shown in FIGS. 9 and 10, the direction of travel of the agricultural machine 10 during the second pass 938 is generally opposite of the direction of travel during the first pass 918. Thus, while making the second pass 938 in the non-coverage area 900, and via use of the row sense guidance mode, the agricultural machine 10 can be guided along a direction that is generally parallel to one or more other crop rows of the first crop rows 904 generally towards the second headland area 912. With such travel, the agricultural machine 10 can eventually enter the second headland area 912, where the agricultural machine 10 can perform another end turn so that the agricultural machine 10 can be oriented to again reenter the non-coverage area 900 of the field 902. The agricultural machine 910 can then, via use of the row sense guidance mode, can be guided along other at least one or more different crop rows of the first crop rows 904 while making a third pass in the non-coverage area 900 toward the first headland area 910. This process can continue until, for example, the particular agricultural operation being perform by the agricultural machine 10 in the non-coverage area 900 is completed.

In the example shown in FIG. 10, the second headland area 912 is a coverage area, and, moreover, is, at least currently, generally devoid of planted crop that is, or will be, harvested. Thus, the illustrated second headland area 912 may lack any crop rows that can be used to provide information for operation of the guidance system 76 in the row sense guidance mode. However, the absence of crop in the illustrated second headland area 912 can provide an opportunity to conduct an end turn of the agricultural machine 10 in the second headland area 910 without concerns regarding damaging crop in the second headland area 912.

Conversely, in the portion of the exemplary field 902 shown in FIG. 9, the first headland area 910 is a non-coverage area, as the headland area 910 has one or more second crop rows 920. Further, in the illustrated example, the second crop rows 920 extend along the first headland area 914 in a second direction (as generally indicated in FIG. 9 by "d₂") that is different than the direction (d₁) that the first crop rows 904 extend in the non-coverage area 900 of the field 902. Moreover, in this example, the second direction (d₂) of the illustrated second crop rows 920 is nearly perpendicular to the direction (d₁) of the first crop rows 904.

The differences in directions (d₁, d₂) of the first and second crop rows 904, 920 can present issues with respect to operating the guidance system 76 in the row sense guidance mode. For example, while the agricultural machine 10 is traveling in the row sense guidance mode along the first crop rows 904 in the non-coverage area 900, the external sensor 13, such as, for example, the mechanical row sensor 98, can contact crops in one or more of the first crop rows 904. Information from the external sensor 13 can be used by the guidance system 76, such as, for example, the guidance controller 78, to issue commands that can control the direction of travel, including the steering, of the agricultural machine 10 such that the agricultural machine 10 moves in a direction that is generally parallel to the first crop rows 904. However, upon the agricultural machine 10 crossing the boundary 88, which, in this example, is a first headland boundary 914, and entering into the first headland area 910, the external sensor 13 can come into contact with one or more of the second crop rows 920. In such a situation, the difference in the directions (d₁, d₂) of the first and second crop rows 904, 920 can create issues with respect to at least the interpretation of the information being provided by the external sensor 13. For example, the change in information corresponding to the external sensor 13 coming into contact one or more of the second crop rows 920 while the agricultural machine 10 is still traveling in a direction generally parallel to the first crop rows 904, or continues along an extension of the first pass 918 into the first headland area 910, can be interpreted as an error, which can, for example, result in a shutdown of the automation of the guidance system 76.

FIG. 11 illustrates a method 1100 for changing the functional state of the automated guidance system 76 based on a position of the agricultural vehicle 10, including, for example, a position of the agricultural machine 10 relative to an end turn, including an end turn in headland areas 914, 916 to do, or do not, include crop rows 912. Such a method 1100 can allow the guidance system 76 of the agricultural machine 10 to remain in and automated mode of operation throughout the duration of an agricultural operation. By being able to remain in an automated guidance mode, including while traveling between non-coverage areas 900 and headland areas 910, 912 or coverage areas, an operator can avoid having to manually switch or toggle in, and out of, an automated guidance mode(s), or between activating an deactivating the guidance system 76. Instead, such switching between guidance modes, including, for example, between the row sense guidance mode and the GPS guidance mode, can be automatically based on at least the position of the agricultural machine 10. Further, such a method 1100 can be enable compatibility of such guidance modes with headland boundaries 914, 916 or coverage areas. Thus, FIG. 11 illustrates an exemplary method 1100 for selective enabling and disabling of operation the guidance system 76, or aspects thereof, including with respect to operation in the row sense guidance mode. Moreover, FIG. 11 illustrates such selective automatic switching between different guidance modes as the agricultural machine crosses into, and from, non-coverage areas 900 and coverage areas or headland areas 910, 912 or associated headland boundaries 914, 916.

The method 1100 is described below in the context of being carried out by the illustrated exemplary system 100 discussed above with respect to at least FIG. 3. However, it should be appreciated that the method 1100 can likewise be carried out by any of the other described implementations, as well as variations thereof. Further, the method 1100 corresponds to, or is otherwise associated with, performance of the blocks described below in the illustrative sequence of FIG. 11. It should be appreciated, however, that the method 1100 can be performed in one or more sequences different from the illustrative sequence. Additionally, one or more of the blocks mentioned below may not be performed, and the method 1100 can include steps or processes other than those discussed below.

At block 1102, the guidance system 76 can be operating with the row sense guidance mode enabled. For example, in the example, shown in FIG. 9, the agricultural machine 10 can be at a first position (as generally indicated by "P₁" in FIG. 9) while making at a first pass 918 along a first guidance line 922 in the non-coverage area 900 of the field 902 and toward the first headland area 910. According to certain embodiments, the first guidance line 922 can be one of a plurality of previously generated and recorded guidance lines for travel in at least the non-coverage area 900 of the field 902. For example, according to certain embodiments, the first guidance line 922 can have been generated during planting of the crop that is in the first crop rows 904. Further, while generally following the first guidance line 922, the guidance system 76 can be further be utilizing the row sense guidance mode such that the agricultural machine 10 moves in a direction that is generally parallel to one or more of the first crop rows 904. Thus, for purposes of illustration, FIG. 9 indicates a first position (P₁) of the agricultural machine 10 in which the agricultural machine 10 is operating in the row sense guidance mode while the agricultural machine 10, or associated implement, is performing an agricultural operation, as indicated by block 1104.

As the agricultural machine 10 travels, the location system 94 can provide information to the guidance system 76 that the guidance system 76 can use to determine if the agricultural machine 10 is approaching, or is within a predetermined distance of, either or both the first headland boundary 914 or the first headland area 910. If the agricultural machine 10 is not approaching either or both the first headland boundary 914 or the first headland area 910, the agriculture machine 10 or implement can continue operating in the non-coverage area 900 of the field 902, as indicated by block 1104. However, if the guidance system 76 determines at block 1106 that the agricultural machine 10 is approaching either or both the first headland boundary 914 or the first headland area 910, then at block 1108, the guidance system 76 determine the type of end turn, or end turn type, that is to be made by the agricultural machine 10. For example, according to certain embodiments, the guidance system 76 can receive, or retrieve, if not already maintained or available by/to the control system 74, a current version of the coverage map 102 for the associated field 902. Such coverage map 102 can provide an indication of whether the first headland area 910 is, or is not, a non-coverage area, and moreover, whether crops that are, or will be, harvested are present in the first headland area 910.

Additionally, according to certain embodiments, the control system 74 can receive, or retrieve, if not maintained by the guidance system 76, information regarding guidance lines, if any, traveled along the first headland area 910, including, but not limited to, traveled while crop was planted in the first headland area 910. Such coverage map 102 or guidance line information can at least assist in determining whether the first headland area 910 contains seeded or growing crops, including crop rows. Moreover, such information can at least be used to assist in determining whether the guidance system 76 is to be operated in a first automated mode so as to attain a first end turn type that at least attempts to minimize damage to crops in the first headland area 910. Moreover, such information can indicate that the guidance system 76 is to be operated to execute a first end turn type that is configured to at least attempt to minimize the extent the engagement bodies 924 of the agricultural machine 10, such as, for example, wheels 14 or tracks, among others, roll or travel over or on crop in the first headland area 910.

In connection with identifying that the end turn in the first headland area 910 is to be the first end turn type, the control system 74 can receive, or retrieve, if not already maintained by the agricultural machine 10, one or more headland guidance lines 926 for the first headland area 910, which may be preexisting guidance lines. For example, headland guidance lines can be generated and recorded in connection during, or in connection with, the planting of crops that are part of the second crop rows 920 in the first headland area 910. Accordingly, in the example, shown in FIG. 9, such headland guidance lines can be generally parallel to the second crop rows 920. Thus, at block 1110, the control system 74, including, for example, the row guidance controller 78, can identify at least one headland guidance line 926 for which, during at least a portion of the end turn in the first headland area 910, the travel of the agricultural machine 10 is to follow.

The selection of one or more headland guidance lines 926 from a plurality of headland guidance lines that can be followed while executing the first end turn type can be based on a variety of different criteria. For example, according to certain embodiments, the selection of at least headland guidance lines 926 for possible use for the first end turn type can be based at least in part on a size of the agricultural machine 10 including, for example an overall width of the agricultural machine 10. Moreover, the selection of headland guidance line 926 to be used with the first end type turn can be based, at least in part, on identifying headland guidance lines 926 that, if followed by the agricultural machine 10, are at a distance away from the first headland boundary 914 or non-coverage area 900 of the field 902 such that the agricultural machine 10 does not extend into the non-coverage area 900 of the field 902 while traveling along the headland guidance line. Additionally, or alternatively, the identified headland guidance lines 924 can be based, at least in part, on a minimum turn radius of the agricultural machine 10. Thus, for example, the selected headland guidance lines 924 can correspond to guidance lines in which the agricultural machine 10 can reach within the first headland area 910 without having to turn at a location at which the agricultural machine 10 may run over crops of the first crop rows 904 in the non-coverage area 900 of the field 902.

The selection of the particular headland guidance line 926 that is to be followed in connection with executing the first end turn type can be automatically made by the control system 74, including the guidance system 76, or selected by an operator of the agricultural machine 10. For example, the guidance system 76 can automatically select the headland guidance line 926 to be used for the first end turn type based on an identification of the headland guidance line 926 that is closest to the first headland boundary 914 that the agricultural machine 10 can reach, and travel along, without running over crop in the first crop rows 904 of the non-coverage area 900 of the field 902, among other considerations or criteria. Further, according to certain embodiments, the control system 74, including the guidance controller 78, can be configured to receive one or more signals from the operator, such as, for example, via the operator using of the I/O device 90, corresponding to the operator overriding, the selected headland guidance line 924, and in which the operator can select another headland guidance line 924 for following in connection with the first end turn type.

Alternatively, or additionally, the guidance system 76, among other portions of the control system 74, can identify or populate a plurality of headland guidance lines 926 that may satisfy certain criteria(s). For example, as previously mentioned, criteria can include, but is not limited, to headland guidance lines 926 that, if followed by the agricultural machine 10, accommodate travel of the agricultural machine 10 along the first headland area 910 without the running over crop in the first crop rows 904 of the non-coverage area 900 of the field 902, among other considerations or criteria. According to such an embodiment, the operator can select, via use of the I/O device 90, a particular headland guidance line 926 from the plurality of identified headline guidance lines 926.

Optionally, the headland guidance line selected at block 1110, which, for example, can correspond to headland guidance line 926 in FIG. 9, can be adjusted at block 1112 so as to provide an offset headland guidance line 928. For example, according to certain embodiments, the operator of the agricultural machine 10 can have the option of adjusting the identified or selected headland guidance line 926 from block 1108 in a direction toward or away from the first headland boundary 914. The extent of such an offset can be based on a variety of different units of measurement. For example, according to certain embodiments, such an offset adjustment can be based on generating an offset headland guidance line 928 that is one or more rows closer to, or further from, the first headland boundary 914. For instance, FIG. 9 illustrates an example in which the headland guidance line 926 selected at block 1110 has been adjusted, or offset, by one row of the second crop rows 920 so as to provide an offset headland guidance line 928 that is closer to the first headland boundary 914 than the identified or selected headland guidance line 926. Additionally, or alternatively, such an offset can be a distance, such as, for example, a selected number of feet or meters, among other units of measurement.

FIG. 9 illustrates an exemplary first end turn type in the form of a first end turn guidance line 930 having a first turn guidance line 932, the identified or selected headland guidance line 926 or offset headland guidance line 928, and a second turn guidance line 934. The first turn guidance line 932 of the first end turn guidance line 930 can have a staring location and an ending location, as generally indicated by $P_3$ and $P_4$, respectively, in FIG. 9. The start location ($P_3$) of the first turn guidance line 932 can be along the first guidance line 922, including a location along a portion of the first guidance line 922, as extended into the first headland area 910. The particular location, which can be expressed as coordinate, such as GPS coordinates, at which the start location ($P_3$) of the first guidance line 922 is positioned along the first guidance line 922 can be determined at block 1114, and can be based on a variety of criteria.

For example, according to certain embodiments, the start location ($P_3$) of the first turn guidance line 932 of the first end turn guidance line 930 can be based, at least in part, on a location at which the entire agricultural machine 10, or each of the engagement bodies 924 of the agricultural machine 10, among other portions of the agricultural machine 10, will not contact, and thus not potentially damage, crop in the first crop rows 904. Thus, according to certain embodiments, the start location ($P_3$) can be determined, at least in part, on a location at which at least the entire agricultural machine 10 is outside of the non-coverage area 900 of the field 902, and, more specifically, a location at which the entire agricultural machine 10 is entirely within the first headland area 910. Additionally, according to certain embodiments, the start location ($P_3$) can also be based, at least in part, on a turn radius, including, but not limited to, a minimum turn radius, that can be attained by the agricultural machine 10. Further, the start location ($P_3$) can also be based, at least in part, on the location of the first guidance line 922 relative to the headland guidance line 926, or the offset headland guidance line 928. Such relative positions can also be identified using coordinates of a coordinate system, including, for example, GPS coordinates. Thus, for example, at least information relating to the location at which the entire agricultural machine 10 is within the first headland area 910, a turn radius of the agricultural machine 10, and the relative locations of the first guidance line 910 and the headland guidance line 926, or the offset headland guidance line 928, the guidance system 76 can determine the start location ($P_3$), can each be considered, among other information, in determining the start location ($P_3$) of the first turn guidance line 932 of the first end turn guidance line 930.

The information used to determine the start location ($P_3$) of the first end turn guidance line 930 can also be used to determine the end location ($P_4$) of the first turn guidance line 932 of the first end turn guidance line 930. Moreover, the end location ($P_4$) can be determined such that the agricultural machine 10 can transition from traveling along curved or rounded path that can be associated with the turn radius of the agricultural machine 10 to the identified or selected headland guidance line 926 or offset headland guidance line 928. Thus, the end location ($P_4$) can be at a location where, while following the first turn guidance line 932, the agricultural machine 10 is generally aligned with the previously selected headland guidance line 926 or the offset headland guidance line 928. Moreover, the first guidance line 922 can be configured to accommodate a generally smooth transition of the agricultural machine 10 from traveling about a turn radius of the agricultural machine 10 associated with the curvature or radius of the first turn guidance line 932 to the headland guidance line 926 or the offset headland guidance line 928.

The second turn guidance line 934 of the first end turn guidance line 930 can also have a start location and an end location, as generally indicated by $P_5$ and $P_6$, respectively, in FIG. 9. The first and second turn guidance lines 932, 934 can be generally at opposing ends of at least the portion of the headland guidance line 926 or the offset headland guidance line 928 that the agricultural machine 10 is to travel in connection with executing the first end turn guidance line 930. Thus, as with the first turn guidance line 932, the guidance system 76, including, for example, the guidance controller 78, can similarly determine at block 1114 the configuration of the second turn guidance line 934.

The start location (P$_5$) of the second turn guidance line 934 of can be configured to transition the agricultural machine 10 from traveling along the headland guidance line 926, or the offset headland guidance line 928, to traveling along a second guidance line 936 that extends at least into the non-coverage area 900 of the field 902. Moreover, similar to the first guidance line 922, the second guidance line 936 can have previously been generated during planting of the crop that is in the first crop rows 904, among being generated at other times. In this example, the second guidance line 936 can generally correspond to a guidance line that will be utilized in connection with the guidance system 79 operating in the first guidance mode, which, in this example, is the row sense operating mode, as the agricultural machine 10 makes the second pass 938 in the field 902.

Thus, similar to the first turn guidance line 932, a determination of the start location (P$_5$) of the second turn guidance line 934 can involve at least considerations of the relative locations of one or more of the headland guidance line 926, or the offset headland guidance line 928, the second guidance line 936 a size, such as either or both the width or length, of the agricultural machine 10, and a predetermined, such as a minimum, turn radius of the agricultural machine 10, among other considerations. Additionally, according to certain embodiments, the start location (P$_5$) selected for the second turn guidance line 934 can correspond to at least a location at which the agricultural machine 10 can, following executing a turn along the second turn guidance line 934 of the first end turn guidance line 930, be at a location that is both generally aligned with, or positioned along, a portion of the second guidance line 936, as extended into the first headland area 910, before the agricultural machine 10 crosses back over the first headland boundary 914, and, moreover, before the agricultural machine 10 returns into the non-coverage area 900 of the field 902. Such a configuration of for the second turn guidance line 934 can be utilized in at least an attempt to prevent, or minimize, instances of at least the engagement bodies 924 of the agricultural machine 10 rolling or traveling over or on, and damaging, crop in the first crop rows 904 in the non-coverage area 900 of the field 902. Additionally, similar to the start location (P$_3$) of the first turn guidance line 932, the start location (P$_5$) of the second turn guidance line 934 can be expressed or identified in a variety of manners, including, but not limited to, as GPS coordinate(s), among coordinates or units of measurement.

According to certain embodiments, the identification of the end turn type that the agricultural machine 10 is to execute, as well as the determination of one or more characteristics of the identified end turn type, can occur before the agricultural machine 10 crosses into the upcoming first or second headland boundary 914, 916. For example, according to the example, shown in FIG. 9, while the agricultural machine 10 is traveling along the first guidance line 922, during the first pass 918, and before crossing the first headland boundary 914, the guidance system 76, including the guidance controller 78, can determine one or more, if not all, of the one or more of the start and end points (P$_3$, P$_4$, P$_5$, P$_6$) of either or both the first or second turn guidance lines 932, 934, or an identification of the headland guidance line 926 or offset headland guidance line 928, as well as combinations thereof, among other characteristics.

At block 1116, the guidance system 76, including, for example, the guidance controller 78, can determine, or otherwise be notified, that the agricultural machine 10 has crossed, is crossing, or has reached the first headland boundary 914, as generally indicated by location "P$_7$" in FIG. 9. The position of a portion or all of the agricultural machine 10 relative to the first headland boundary 914, including reaching or crossing the first headland boundary 914, can be determined in a variety of different manners, including, for example, via coordinates, such as, for example, GPS coordinates. Further, according to certain embodiments, such detection of the agricultural machine 10 crossing the first headland boundary 914 (as generally indicated by location "P$_2$" in FIG. 9) can correspond to a portion of the agricultural machine 10, such as, for example, the header 18 reaching the first headland boundary 914.

At block 1118, in response to detection of at least a portion, if not all, of the agricultural machine 10 crossing the first headland boundary 914 at block 1116, the guidance system 76, including, for example, the guidance controller 78, can at least temporarily cease being operated in the first guidance mode, which, again, in this example, is the row sense guidance mode. For example, according to certain embodiments, while the row sense guidance mode may continue to generate information or issue commands for the guidance of the agricultural machine 10. However, that information or commands can be ignored by the guidance system 76 at least with respect to that information or commands are not utilized in the guidance of the agricultural machine 10. Additionally, or alternatively, at block 1118, the row sense guidance mode can be at least temporarily automatically disabled. Such disabling of the row sense guidance mode, or ignoring of instructions or commands corresponding to the operation of the row sense guidance mode, without deactivating the row sense guidance mode, or any other guidance mode, can prevent or eliminate errors in the operation of the guidance system 76. For example, as previously discussed, such errors can occur in connection the external sensor 13 coming into contact with the second crop rows 920 as the agricultural machine 10 enters the first headland area 910. However, by not deactivating the row sense guidance mode, or operation of the automated guidance system 76, the automated guidance system 76 can, at the appropriate time, automatically re-enable use of the row sense guidance mode, as discussed below. Further, rather than deactivating the guidance system 76, the detection of at least a portion of the reaching or crossing the first headland boundary 914 can automatically trigger the guidance system 76 from operating in the first guidance mode to a second guidance mode. More specifically, in the illustrated example, the detection of at least a portion of the reaching or crossing the first headland boundary 914 can trigger the guidance system 76 changing from operating in the row sense guidance mode to operating in the GPS guidance mode.

Accordingly, in the illustrated embodiment, with the row sense guidance mode disabled or being ignored, and the guidance system 76 instead operating in the GPS guidance mode, the agricultural machine 10 can use GPS coordinates to determine if, or when, the agricultural machine 10 reaches the start location (P$_3$) of the first turn guidance line 932 of the first end turn guidance line 930. Further, to the extent the agricultural machine 10 is to travel further within the first headland area 910 to reach the start location (P$_3$) of the first turn guidance line 932, such travel can be generally continue along the first guidance line 922, or an extension thereof, that the agricultural machine 10 was traveling as the agricultural machine 10 crossed the first headland boundary 914. Upon reaching the start location ($P_3$) of the first turn guidance line 932, the GPS guidance mode can, at block 1120, be utilized to commence, and execute, a turn along the previously determined first turn guidance line 932. Further, the GPS guidance mode can continue to be utilized to determine when the agricultural machine 10 reaches the end location ($P_4$) of the first turn guidance line 932, or is otherwise positioned to travel along the identified or selected headland guidance line 926 or the offset headland guidance line 928.

Upon determining that the agricultural machine 10 has reached the end location ($P_4$) of the first turn guidance line 932, or is generally aligned with the headland guidance line 926, or the offset headland guidance line 928, as indicated by block 1122, then at block 1124 the guidance system 76 can automatically change from operating in the second guidance mode, which in this example is the GPS guidance mode, and return to operating using the first guidance mode, which, again, in this example is the row sense guidance mode. With the guidance system 76 again operating in the row sense guidance mode and positioned or aligned about the selected headland guidance line 926 or the offset headland guidance line 928, at block 1124 the agricultural machine 10 can begin traveling in a direction that is generally parallel to the second crop rows 920.

The agriculture machine 10 can continue operating using the row sense guidance mode as the agricultural machine 10 a direction that is generally parallel to the second crop rows 920 until the agricultural machine 10 reaches the start location ($P_4$) for the second turn guidance line 934. According to certain embodiments, the guidance system 76 can determine that the agricultural machine 10 has reached the start location ($P_4$) for the second turn guidance line 934 in a variety of different manners, including, for example, via the use of coordinates, such as, GPS coordinates, among others.

Upon reaching the start location ($P_4$) for the second turn guidance line 934, the guidance system 76 can again disable operation, or otherwise ignore information or commands that may be generated in associate with the operation, of the first guidance mode, and, more specifically, the row sense guidance mode, without deactivating the row sense guidance mode. Moreover, as the agricultural machine 10 will be leaving the headland guidance line 926 or the offset headland guidance line 928 as the agricultural machine 10 turns along the second turn guidance line 934, the agriculture machine 10 will no longer be traveling in a direction that is generally parallel to the second crop rows 920. Thus, as the agricultural machine 10 turns along the second turn guidance line 934, information generated in connection with the crops in the first headland area 910 that the external sensor 13 does contact can, if the row sense guidance mode is not ignored or disabled, result in generation of errors for the guidance system that can result in deactivation of the guidance system 76, as previously discussed.

Therefore, according to the illustrated embodiment, at block 1126, as the agricultural machine 10 has reached the start location ($P_4$) for the second turn guidance line 934, or is commencing the second turn of the first end turn guidance line 930, the row sense guidance mode can be disabled or ignored without deactivation of the row sense guidance mode. Moreover, reaching the start location ($P_4$) for the second turn guidance line 934 can automatically trigger the guidance system 76 from operating in the first guidance mode, namely the row sense guidance mode in this example, to the second guidance mode, which, in this example, is the GPS guidance mode.

Further, the second turn of the end turn guidance line 930 can continue unit the agricultural machine 10 reaches the end location ($P_6$) of the second turn guidance line 934. According to the illustrated embodiment, the end location ($P_6$) of the second turn guidance line 934 can correspond to, or is generally at location at which, the second turn guidance line 934 meets a portion of the second guidance line 936 that the agricultural machine 10 is to generally follow on the next pass in the non-coverage area 900 of the field 902, which, in this example, is the second pass 938.

At block 1128, the second turn of the first end turn guidance line 930 can be completed, such as, for example with the agricultural machine 10 reaching the end location ($P_6$) of the second turn guidance line 934, or otherwise being aligned with, or positioned on, a selected guidance line of the next pass in the non-coverage area 900, which, in this example, is the second guidance line 936. With the agricultural machine 10 positioned on the second guidance line 936, the agricultural machine 10 can proceed towards the first headland boundary 914, and thus can be traveling in a direction again that is generally parallel to the first crop rows 904. However, as the agricultural machine 10 is traveling in the first headland area 910 only the second guidance line 926, and thus in a direction that is not generally aligned with the direction (d 2) of the second crop rows 920, the guidance system 76 will continue to operate in the second guidance mode (e.g., the GPS guidance mode). Thus, as with traveling along the second turn guidance line 934, as the agricultural machine 10 generally travels along, or in alignment with, the second guidance line 936 in the row sense guidance mode continues to be disabled or ignored.

At block 1130, the agricultural machine 10 can determine that the agricultural machine 10 is crossing the first headland boundary 914, or is otherwise re-entering into the non-coverage area 900 of the field 902. Again, the guidance system 76 can determine that the agricultural machine 10 is crossing the first headland boundary 914, or entering into the non-coverage area 900 of the field 902, in a variety of different manners, including, for example, evaluating a location of the agricultural machine 10, such as, for example, as indicated via GPS coordinates, with GPS coordinates for the first headland boundary 914 or the non-coverage area 900 of the field 902. The detection that the agricultural machine 10 has crossed the first headland boundary 914, or is entering into the non-coverage area 900 of the field 902, can automatically trigger the guidance system 76 to switch from the second guidance mode (e.g., the GPS guidance mode) to the first guidance mode (row sense guidance mode), as again indicated by block 1102. With the row sense guidance mode enabled, information from the external sensors 13 regarding contacts with crops in one or more of the first crop rows 904 can be utilized to again direct travel of the agricultural machine 10 in a direction that is generally parallel to the first crop rows 904.

Returning to block 1108, if a determination is made at block 1108 that the agricultural machine 10 will be entering into headland area that is a coverage area, which, in this example, is the second headland area 912 (FIG. 10) then guidance system 76 can determine that the agricultural machine 10 is to execute a second end turn type. Unlike the first and turn type, the second end turn type can be configured without consideration or identification of any preexisting headland guidance lines to be followed or adjusted when the agricultural machine 10 make the end turn. Moreover, in the absence of crop or associated crop rows in the second headland area 912, the second end turn type can be configured without concern regarding, or attempt to minimize, the agricultural machine 10 damaging crop within the second headland area 912.

Therefore, in the illustrated embodiment, if the end turn is to be a second end turn type, then at block 1132 a second end turn guidance line 940 (FIG. 11) can be generated in which the agricultural machine 10 may travel either or both the shortest or fastest distance the agricultural machine 10 is capable of traveling for an end turn in the second headland area 912. Thus, the guidance system 76 can generate, at block 1132, a second end turn guidance line 940 for an end turn in the second headland area 912 that may be faster than the first end turn type. Accordingly, in the illustrated example, the second end turn guidance line 940 can be configured to perform an end turn so that the position of the agricultural machine 10 changes from traveling in one direction along the second guidance line 936 in the non-coverage area 900 of the field 902 to traveling in another, generally opposite direction along a different guidance line 942 in the non-coverage area 900 of the field 902.

As with the first end turn type, the guidance system 76 can generate the second end turn guidance line 940 prior to the agricultural machine 10 entering into the second headland area 912, such as, for example, at or around the location "P₁" in FIG. 10. Thus, similar to block 1116 discussed above, upon detecting that the agricultural machine has, or is, crossing the second headland boundary 916, as indicated by block 1134 and generally indicated by location "P₂" in FIG. 10, the guidance system 76 can be triggered to automatically change from operating in the first guidance mode (e.g. the row sense guidance mode) to operating in the second guidance mode (e.g. the GPS guidance mode), as indicated by block 1136. Thus, the row sense guidance mode can again be disabled or otherwise ignored. According to certain embodiments, the row sense guidance mode may not be disabled or ignored until the entire agricultural machine 10 has entered into the second headland area 912. Again, such disabling or ignoring of the row sense guidance mode may be attained without deactivating the row sense guidance mode such that the row sends guidance mode can later be automatically re-enabled.

Operating in the GPS guidance mode, the agricultural machine 10 can travel along the second end turn guidance line 940, as indicated by block 1138. Further, the agricultural machine 10 can continue to operate in the GPS guidance mode until at least a portion of the agricultural machine 10 again contacts, or crosses, the second headland boundary 916. The timing of when the agricultural machine 10 contacts or crosses the second headland boundary 916 can be determined in the variety of different manners, including, for example, based on a determination of the GPS coordinates of a portion of the header relative to the location of the second headland boundary 916. Thus, upon at least a portion of the agriculture machine 10, such as, for example, a portion of the header 18 reaching, or crossing, the second headland boundary 916, as generally indicated by location "P₃" in FIG. 10, the guidance system 76 can again automatically be triggered to re-enable the first guidance mode (e.g., the row sense guidance mode), as indicated by block 1102. Such enablement of the row sense guidance mode can also again correspond with the second guidance mode (e.g., the GPS guidance mode) being disabled. The above-discussed method 1100 can then be repeated as the agricultural machine 10 continues making passes along the non-coverage area 900 of the field 902, and thus executes multiple end turns in the first and second headland areas 914, 916.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A system for guiding travel of an agricultural machine, the system comprising:

a guidance system having a first guidance mode and a second guidance mode, the first guidance mode comprising a row sense guidance mode;

a steering controller configured to actuate a steering system of the agricultural machine;

at least one processor;

a memory device coupled with the at least one processor, the memory device including instructions that when executed by the at least one processor causes the at least one processor to:

determine an end turn guidance line for an end turn of the agricultural machine in a headland area, the end turn guidance line comprising a first turn guidance line, a second turn guidance line, and a headland guidance line, wherein the first turn guidance line is configured to guide the agricultural machine from a first guidance line that crosses a boundary between a non-coverage area and a headland area to the headland guidance line, the headland guidance line extends in a direction that is generally parallel to a crop row in the headland area, the second turn guidance line is configured to guide the agricultural machine from the headland guidance line to a second guidance line that crosses the boundary, and the first guidance line and the second guidance line are non-parallel to the direction of the crop row;

trigger an operation of the guidance system from the first guidance mode to the second guidance mode upon the agricultural machine approaching or crossing the boundary from the non-coverage area, and issue a steering command via the steering controller to follow the first turn guidance line toward the headland guidance line;

trigger the operation of the guidance system from the second guidance mode to the first guidance mode upon the agricultural machine either (1) being aligned with, or on, the headland guidance line or (2) upon reaching an end location of the first turn guidance line, and issue a steering command via the steering controller to travel along the headland guidance line in a direction generally parallel to crop rows;

trigger the operation of the guidance system from the first guidance mode to the second guidance mode upon the agricultural machine reaching a start location of the second turn guidance line, and issue a steering command via the steering controller to follow the second turn guidance line toward the second guidance line; and trigger the operation of the guidance system from the second guidance mode to the first guidance mode upon the agricultural machine approaching or crossing the boundary from the headland area, and issue a steering command via the steering controller to travel along the second guidance line.

2. The system of claim 1, wherein the memory device further includes instructions that when executed by the at least one processor causes the at least one processor to identify a plurality of headland guidance lines and receive a signal from an input/output device of a selection of the headland guidance line from the plurality of headland guidance lines.

3. The system of claim 1, wherein the memory device further includes instructions that when executed by the at least one processor causes the at least one processor to receive a signal from an input/output device of an adjustment in a location of the headland guidance line.

4. The system of claim 3, wherein the crop row is a plurality of crop rows, and wherein the adjustment to the location of the headland guidance line offsets the location of the headland guidance line by at least one crop row of the plurality of crop rows.

5. The system of claim 1, wherein the memory device further includes instructions that when executed by the at least one processor causes the at least one processor to retrieve or receive a plurality of preexisting headland guidance lines, and wherein the headland guidance line is selected from the plurality of preexisting headland guidance lines.

6. The system of claim 1, wherein the second guidance mode is a GPS guidance mode.

7. The system of claim 1, wherein at least one of the first guidance line and the second guidance line is parallel to a plurality of crop rows in the non-coverage area.

8. The system of claim 1, wherein the memory device further includes instructions that when executed by the at least one processor causes the at least one processor to identify the headland area is a second non-coverage area.

9. The system of claim 1, wherein the memory device further includes instructions that when executed by the at least one processor causes the at least one processor to identify the headland guidance line from a plurality of headland guidance lines based, at least in part, on the headland guidance line being a distance from at least one of the boundary and the non-coverage area such that the agricultural machine does not cross the boundary or enter the non-coverage area as the agricultural machine travels in the first guidance mode along the headland guidance line.

10. The system of claim 1, wherein the memory device further includes instructions that when executed by the at least one processor causes the at least one processor to determine at least one of the start location and the end location of the first turn guidance line based, at least in part, on a minimum turn radius of the agricultural machine.

11. A method for guiding travel of an agricultural machine, the method comprising:
   determining an end turn guidance line for an end turn of the agricultural machine in a headland area, the end turn guidance line comprising a first turn guidance line, a second turn guidance line, and a headland guidance line, wherein
      the first turn guidance line is configured to guide the agricultural machine from a first guidance line that crosses a boundary between a non-coverage area and a headland area to the headland guidance line,
      the headland guidance line extends in a direction that is generally parallel to a crop row in the headland area,
      the second turn guidance line is configured to guide the agricultural machine from the headland guidance line to a second guidance line that crosses the boundary, and the first guidance line and the second guidance line are non-parallel to the direction of the crop row;
   triggering an operation of the guidance system from a first guidance mode to a second guidance mode upon the agricultural machine approaching or crossing the boundary from the non-coverage area, the first guidance mode comprising a row sense guidance mode, and issuing a steering command to a steering controller configured to actuate a steering system of the agricultural machine to follow the first turn guidance line toward the headland guidance line;
   triggering the operation of the guidance system from the second guidance mode to the first guidance mode upon the agricultural machine either (1) being aligned with, or on, the headland guidance line or (2) upon reaching an end location of the first turn guidance line and issuing a steering command via the steering controller to travel along the headland guidance line in a direction generally parallel to crop rows;
   triggering the operation of the guidance system from the first guidance mode to the second guidance mode upon the agricultural machine reaching a start location of the second turn guidance line, and issuing a steering command via the steering controller to follow the second turn guidance line toward the second guidance line; and
   triggering the operation of the guidance system from the second guidance mode to the first guidance mode upon the agricultural machine approaching or crossing the boundary from the headland area, and issuing a steering command via the steering controller to travel along the second guidance line.

12. The method of claim 11, further comprising identifying a plurality of headland guidance lines and receive a signal from an input/output device of a selection of the headland guidance line from the plurality of headland guidance lines.

13. The method of claim 11, further comprising receiving a signal from an input/output device of an adjustment in a location of the headland guidance line.

14. The method of claim 13, further comprising adjusting the location of the headland guidance line by at least one crop row of the plurality of crop rows.

15. The method of claim 11, further comprising retrieving or receiving a plurality of preexisting headland guidance lines, and wherein the headland guidance line is selected from the plurality of preexisting headland guidance lines.

16. The method of claim 11, wherein the second guidance mode is a GPS guidance mode.

17. The method of claim 11, wherein at least one of the first guidance line and the second guidance line is parallel to a plurality of crop rows in the non-coverage area.

18. The method of claim 11, further comprising identifying the headland area is a second non-coverage area.

19. The method of claim 11, further comprising identifying the headland guidance line from a plurality of headland guidance lines based, at least in part, on the headland guidance line being a distance from at least one of the boundary and the non-coverage area such that the agricultural machine does not cross the boundary or enter the non-coverage area as the agricultural machine travels in the first guidance mode along the headland guidance line.

20. The method of claim 11, further comprising determining at least one of the start location and the end location of the first turn guidance line based, at least in part, on a minimum turn radius of the agricultural machine.

* * * * *